United States Patent
Chan et al.

(10) Patent No.: US 10,887,225 B1
(45) Date of Patent: Jan. 5, 2021

(54) BUILDING A LABEL SEQUENCE IN BORDER GATEWAY PROTOCOL (BGP) LABELED NETWORK LAYER REACHABILITY INFORMATION (NLRI) ON NEXT HOP (NH) ATTRIBUTE CHANGE

(71) Applicant: Juniper Networks, Inc., Sunnyvale, CA (US)

(72) Inventors: Wai Tong Louis Chan, Kowloon (HK); Rafal Jan Szarecki, San Jose, CA (US); Krzysztof Grzegorz Szarkowicz, Vienna (AT); Jeffrey M. Haas, Ypsilanti, MI (US); Santosh S. Kolenchery, Cary, NC (US); Srihari Ramachandra Sangli, Bengaluru (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/588,691

(22) Filed: Sep. 30, 2019

(51) Int. Cl.
  *H04L 12/723* (2013.01)
  *H04L 12/715* (2013.01)
  (Continued)

(52) U.S. Cl.
  CPC ........ *H04L 45/507* (2013.01); *H04L 12/4633* (2013.01); *H04L 12/66* (2013.01);
  (Continued)

(58) Field of Classification Search
  CPC ..... H04L 45/50; H04L 45/507; H04L 45/745; H04L 45/02
  See application file for complete search history.

(56) References Cited

U.S. PATENT DOCUMENTS 7,936,780 B1 * 5/2011 Kompella ............. H04L 45/507
                                                    370/466
8,571,029 B1 * 10/2013 Aggarwal ............... H04L 45/50
                                                    370/390
(Continued)

OTHER PUBLICATIONS

E. Rosen, "Using BGP to Bind MPLS Labels to Address Prefixes" *Request for Comments* 8277 (Internet Engineering Task Force, Oct. 2017).

(Continued)

*Primary Examiner* — Shean Tokuta
(74) *Attorney, Agent, or Firm* — John C. Pokotylo; Pokotylo Patent Services

(57) ABSTRACT

The use and processing of update messages (e.g., BGP UPDATEs) that bind (e.g., MPLS) labels to address prefixes is improved such that labels are used more efficiently, and/or such that such update messages can be processed more efficiently. A distance vector control signaling protocol (e.g., BGP) peer device receives a control plane message (e.g., BGP Update) from a downstream peer device, the control plane message including (1) a network address of the downstream device as a next hop value, (2) a prefix value, and (3) at least one label associated with the prefix value. Responsive to receiving the control plane message, the peer device generates a new control plane message including (1) a network address of the peer device as a next hop value, (2) the prefix value from the control plane message, and (3) a label stack including (i) the at least one label from the control plane message, and (ii) a local label associated with the peer device. The peer device then sends the new control plane message to an upstream peer device.

19 Claims, 19 Drawing Sheets

(51) Int. Cl.
*H04L 12/66* (2006.01)
*H04L 12/733* (2013.01)
*H04L 12/46* (2006.01)
*H04L 12/741* (2013.01)

(52) U.S. Cl.
CPC .............. *H04L 45/04* (2013.01); *H04L 45/20* (2013.01); *H04L 45/74* (2013.01)

(56) References Cited

U.S. PATENT DOCUMENTS

| | | | | |
|---|---|---|---|---|
| 9,246,801 | B1* | 1/2016 | Kompella | H04L 45/50 |
| 9,832,121 | B1* | 11/2017 | Singh | H04L 47/122 |
| 2006/0164975 | A1 | 7/2006 | Filsfils et al. | |
| 2007/0091793 | A1* | 4/2007 | Filsfils | H04L 45/50 |
| | | | | 370/228 |
| 2010/0080169 | A1* | 4/2010 | Berzin | H04W 40/248 |
| | | | | 370/328 |
| 2011/0235545 | A1* | 9/2011 | Subramanian | H04L 45/54 |
| | | | | 370/254 |
| 2015/0030026 | A1* | 1/2015 | Kumar | H04L 43/0811 |
| | | | | 370/392 |
| 2015/0109902 | A1* | 4/2015 | Kumar | H04L 41/0668 |
| | | | | 370/219 |
| 2015/0146536 | A1* | 5/2015 | Minei | H04L 45/507 |
| | | | | 370/236 |
| 2016/0308767 | A1* | 10/2016 | Borgione | H04L 45/745 |
| 2016/0366051 | A1* | 12/2016 | Chen | H04L 45/50 |
| 2016/0380889 | A1* | 12/2016 | Chen | H04L 12/4633 |
| | | | | 370/230 |
| 2018/0351857 | A1* | 12/2018 | Vairavakkalai | H04L 63/0272 |
| 2018/0351863 | A1* | 12/2018 | Vairavakkalai | H04L 45/125 |
| 2019/0173791 | A1* | 6/2019 | Lim | H04L 45/748 |
| 2019/0182213 | A1* | 6/2019 | Saavedra | H04L 63/0236 |
| 2019/0349268 | A1* | 11/2019 | Pai | H04L 45/42 |
| 2019/0363978 | A1* | 11/2019 | Singh | H04L 49/102 |

OTHER PUBLICATIONS

Extended European Search Report to corresponding European Patent Application No. 19217821.8-1213, dated Mar. 17, 2020 (6 pgs.).

* cited by examiner

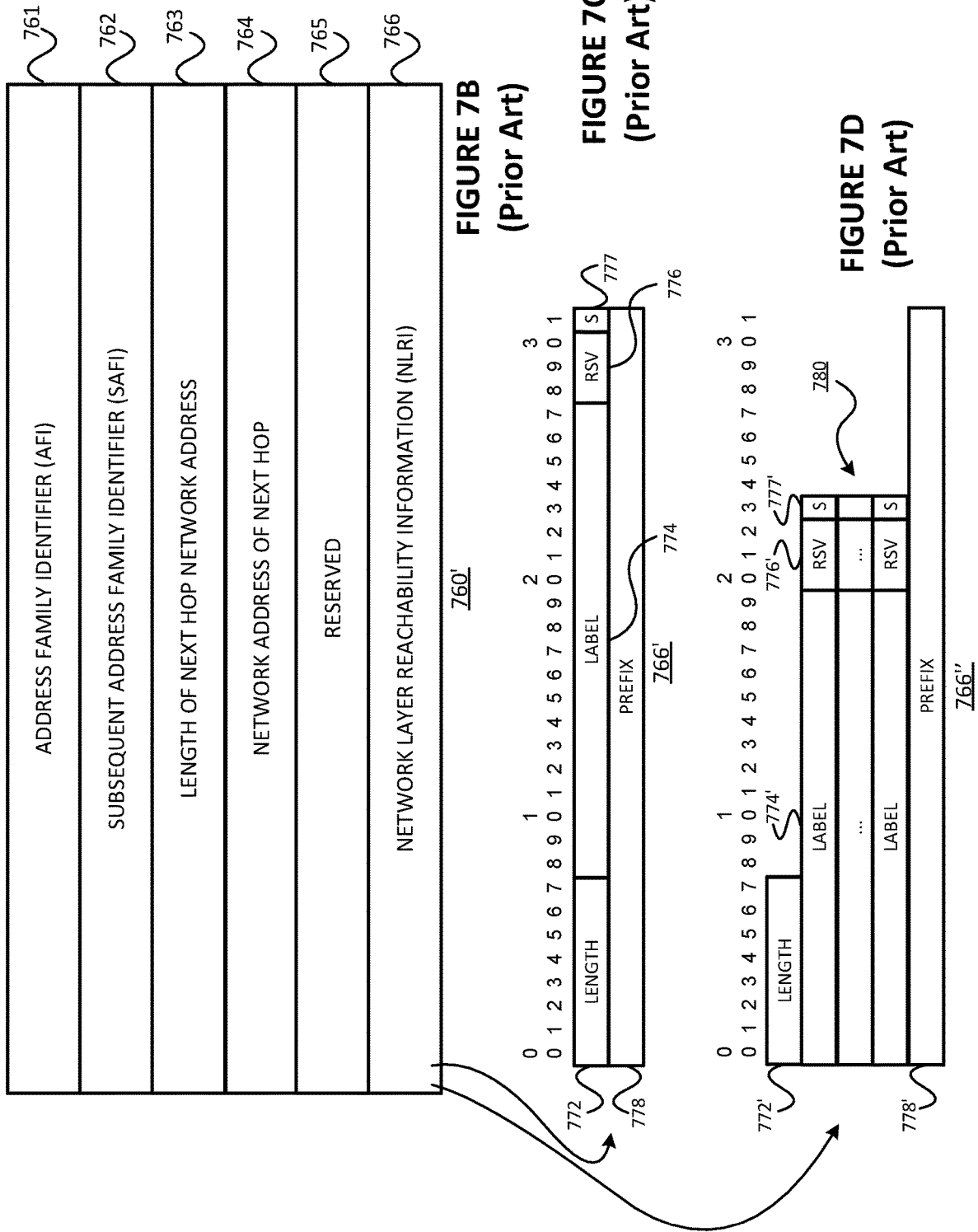

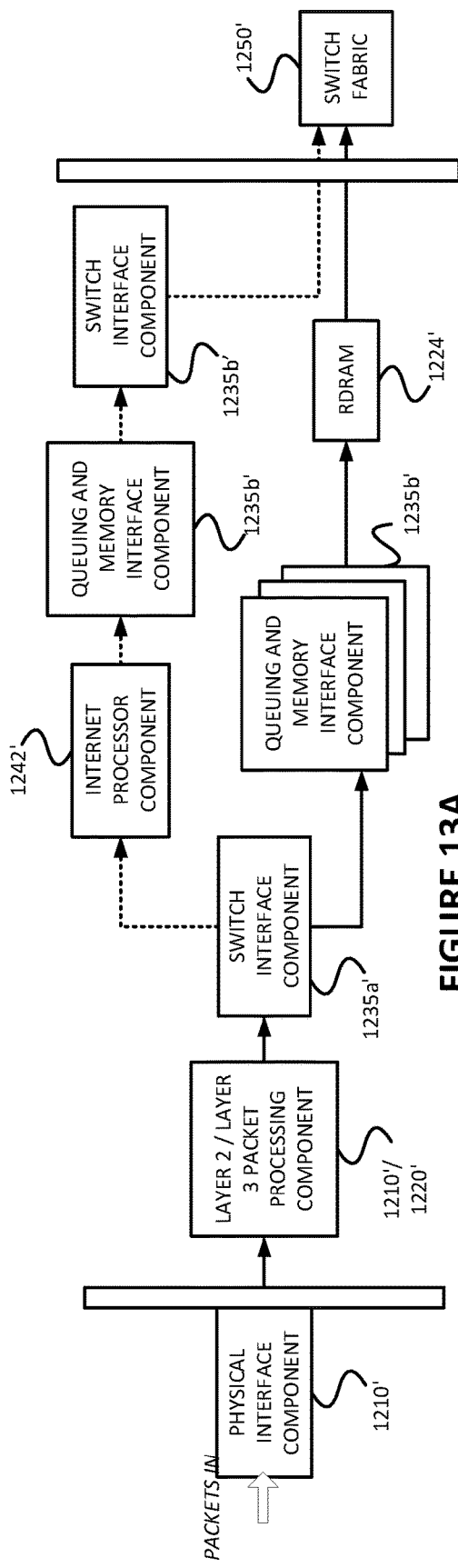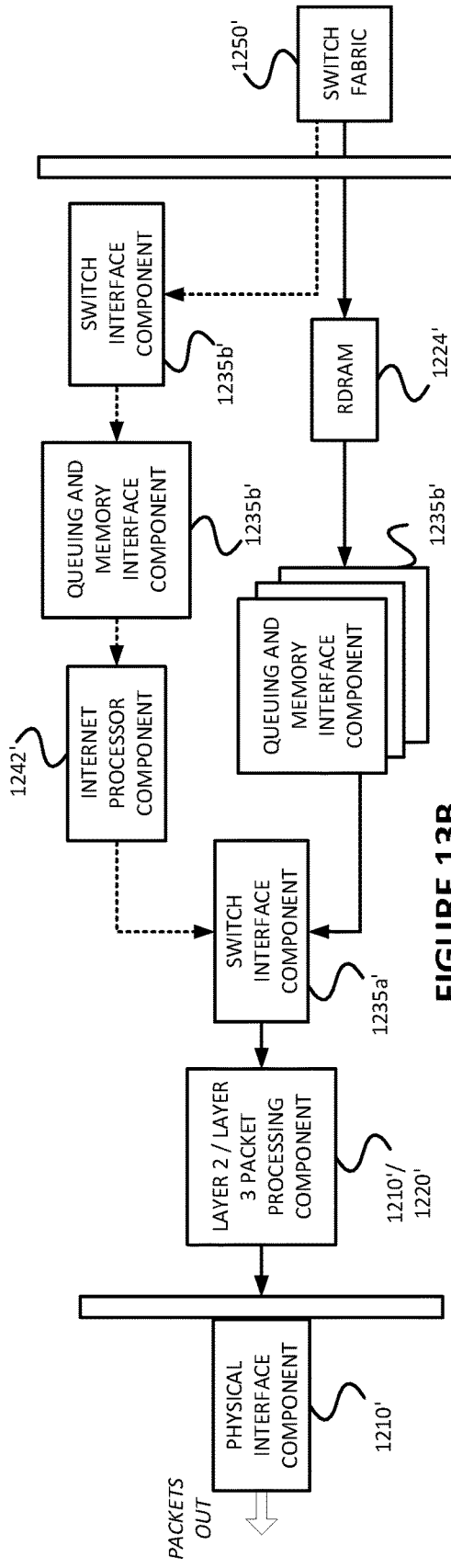
FIGURE 13A
FIGURE 13B

BUILDING A LABEL SEQUENCE IN BORDER GATEWAY PROTOCOL (BGP) LABELED NETWORK LAYER REACHABILITY INFORMATION (NLRI) ON NEXT HOP (NH) ATTRIBUTE CHANGE

§ 1. BACKGROUND OF THE INVENTION

§ 1.1 Field of the Invention

The present description concerns communications networks. More specifically, the present description concerns signaling network information, to be used for forwarding data, in a communications network, such as a communications network employing segment routing (SR).

§ 1.2 Background Information

Although Segment Routing (SR) and the Border Gateway Protocol (BGP) are well understood by those skilled in the art, each is introduced below for the reader's convenience.

§ 1.2.1 Segment Routing

The Internet was initially designed to provide best-effort connectivity over a least-cost path. In today's Internet, however, many applications require more than best-effort connectivity over a least-cost path. Today, network operators are tasked with delivering advance services such as traffic engineering and fast reroute at scale. To deliver these advanced services at scale, network operators must reduce network complexity. Segment Routing (SR) offers an innovative approach to traffic steering. It can be applied to long-standing problems such as traffic engineering and fast reroute. When applied to these problems, SR can simplify routing protocols, network design and network operations.

Segment routing (also referred to as Source Packet Routing in Networking ("SPRING")) is a control-plane architecture that enables an ingress router to steer a packet through a specific set of nodes and links in the network without relying on the intermediate nodes in the network to determine the actual path it should take. In this context, the term "source" means the point at which the explicit route is imposed. Segment routing is defined in "Segment Routing Architecture," Request for Comments 8402 (July 2018, the Internet Engineering Task Force) (referred to as "RFC 8402" and incorporated herein by reference). SPRING enables automation of a network by using a software-defined network ("SDN") controller for traffic steering and traffic engineering in a wide area network ("WAN") packet network.

Segment routing leverages the source routing paradigm. A node steers a packet through an ordered list of instructions, called "segments." For example, an ingress router (also referred to as "a headend router") can steer a packet through a desired set of nodes and links by prepending the packet with segments that contain an appropriate combination of tunnels.

§ 1.2.1.1 SR Domain

An SR domain is a collection of nodes that participate in SR protocols. Within an SR domain, a node can execute ingress, transit, or egress procedures. FIG. 1 depicts a network in which a source node sends a packet to a destination node. The source and destination nodes reside outside of the SR domain, but the path between them traverses the SR domain. More specifically, when the packet arrives at the SR ingress node (R1), the ingress node subjects the packet to policy. Policy can associate a packet with an SR path. Policy includes match conditions and actions. If the packet satisfies match conditions, the SR ingress node (R1) can encapsulate the packet in an SR tunnel. The SR tunnel traverses an SR path to the egress node (R6).

The SR path can be engineered to satisfy any number of constraints (e.g., minimum link bandwidth, maximum path latency). While an SR path can follow the least cost path to the egress node, constraints can cause it to follow another path.

The source node and the SR ingress node may reside on independent hardware platforms (e.g., on a laptop and a router, respectively), or the source node and SR ingress node can reside on the same hardware (e.g., on a virtual machine and a hypervisor, respectively). Similarly, the SR egress node and the destination node can reside on independent hardware platforms, or on a single platform. In a less typical configuration, the source node resides within the SR domain. In this case, the source node is also the SR ingress node, because it executes SR ingress procedures Similarly, the destination node can reside within the SR domain, in which case, the destination node is also the SR egress node, because it executes SR egress procedures.

§ 1.2.1.2 SR Path

An SR path is an ordered list of segments that connects an SR ingress node to an SR egress node. Although an SR path can follow the least cost path from ingress to egress, it can also follow another path.

Different SR paths can share the same segment. For example, referring to FIG. 2, Path A connects ingress node A to egress node Z, while Path B connects ingress node B to the same egress node Z. Both paths A and B traverse Segment 3.

When an SR ingress node encapsulates a packet in an SR tunnel, it encodes the associated segment list in the tunnel header. It then forwards the packet downstream. Transit nodes process the tunnel header, forwarding the packet from the current segment to the next segment. Since the SR ingress node encodes path information in the tunnel header, transit nodes do not need to maintain information regarding each path that they support. Rather, the transit nodes are only required to process the tunnel header, forwarding the packet from the current segment to the next segment. This is a major benefit of SR. More specifically, since transit nodes are not required to maintain path information, overhead associated with maintaining that information is eliminated, routing protocols are simplified, scaling characteristics are improved, and network operations become less problematic.

§ 1.2.1.3 SR Segments and Segment Types

An SR segment is an instruction that causes a packet to traverse a section of the network topology. While a segment (i.e., an instruction) causes a packet to traverse a section of the network topology, it is distinct from that section of the network topology. SR defines many different SR segment types. Among these are the "adjacency segments" and "prefix segments." Each of these types of segments is described below.

§ 1.2.1.3.1 Adjacency Segments

An adjacency segment is an instruction that causes a packet to traverse a specified link (i.e., a link that is associated with an IGP adjacency). FIG. 3 depicts an SR path that connects ingress node R1 to egress node R6. The path contains the following adjacency segments: (1) segment 1, instantiated on R1, causes packets to traverse link R1→R2; (2) segment 2, instantiated on R2, causes packets to traverse link R2→R3; and segment 3, instantiated on R3, causes packets to traverse link R3→R6. If any of the above-mentioned links becomes unavailable, so does the associated adjacency segment. Consequently, if any of the above-mentioned adjacency segments becomes unavailable, so does the entire path.

Thus, an adjacency segment is a strict forwarded single-hop tunnel that carries packets over a specific link between two nodes, irrespective of the link cost.

§ 1.2.1.3.2 Prefix Segments

A prefix segment is an instruction that causes a packet to traverse the least cost path (or a path determined using an identified algorithm) to a node or prefix. Referring to FIG. 4A, assume that all links are configured with the same interior gateway protocol (IGP) metric and that the SR path is to be a least cost (and therefore) shortest path. An SR path connects ingress node R1 to egress node R6 and contains the following prefix segments: (1) segment 1, instantiated on R1, causes packets to traverse the least cost path from R1 to R2; (2) segment 2, instantiated on R2 and R3, causes packets to traverse the least cost path from the instantiating node to R6. Consequently, when the links are all available, the SR path guides packets through the above-mentioned links and segments.

Referring to FIG. 4B, assume that the link R1→R2 becomes unavailable. When this occurs, the network establishes a new least cost path between R1 and R2. This new least cost path includes Links R1→R4, and R4→R2. Since the network has established a new least cost path between R1 and R2, segment 1 remains available and causes packets to traverse the new least cost path. The behavior of segment 2 is unchanged. Therefore, the path now traverses Links R1→R4, R4→R2, R2→R3 and R3→R6.

Thus, a prefix segment is a multihop tunnel that uses equal cost multi-hop aware shortest path links to reach a prefix. A prefix segment identifier (SID) supports both IPv4 and IPv6 prefixes. A node segment is a special case of prefix segment that uses shortest path links between two specific nodes.

§ 1.2.1.3.3 Anycast Segments

An IGP anycast segment is an IGP prefix segment that identifies a set of routers. An anycast segment enforces forwarding based on the equal-cost multipath-aware (ECMP-aware) shortest-path toward the closest node of the anycast set. Within an anycast group, all the routers advertise the same prefix with the same segment identifier (SID) value, which facilitates load balancing. Thus, an anycast segment is also a type of prefix segment that identifies a set of routers to advertise the same prefix with the same SID value.

§ 1.2.1.4 SR Multi-Protocol Label Switching (MPLS)

In SR-MPLS, SR paths are encoded as MPLS label stacks, with each label stack entry representing a segment in the SR path. The following describes how MPLS labels are used to encode adjacency and prefix segments.

§ 1.2.1.4.1 Using MPLS Labels to Encode Adjacency Segments

Referring to FIG. 5, an SR path connects R1 to R4. The SR path contains three adjacency segments. Segment 1 causes packets to traverse link R1→R2, segment 2 causes packets to traverse link R2→R3, and segment 3 causes packets to traverse link R3→R4. When R1 receives a packet from outside of the SR domain, it subjects the packet to policy. Policy may cause R1 to forward the packet through the SR path shown in FIG. 5. When this occurs, R1 imposes an MPLS label stack containing two entries. The entry at the top of the stack represents segment 2 and carries MPLS label 1002. The entry at the bottom of the stack represents segment 3 and carries MPLS label 1003.

Having imposed an MPLS label stack, R1 forwards the encapsulated packet through segment 1 (i.e., Link R1→R2). When the packet arrives at R2, R2 extracts the top label (i.e., 1002) from the label stack and searches for a corresponding entry in its Forwarding Information Base ("FIB"). The corresponding FIB entry includes an instruction (i.e., POP) and a next-hop (i.e., R3). Therefore, R2 pops the topmost label from the label stack and forwards the packet through segment 2 (i.e., Link R2→R3).

When the packet arrives at R3, R3 extracts the label (i.e., 1003) from the remaining label stack and searches for a corresponding entry in its FIB. The corresponding FIB entry includes an instruction (i.e., POP) and a next-hop (i.e., R4). Therefore, R3 pops the remaining entry from the label stack and forwards the packet through segment 3 (i.e., Link R3→R4). As shown in FIG. 5, after traversing the SR path, the packet arrives at R4 without MPLS encapsulation.

§ 1.2.1.4.2 Using MPLS Labels to Enclode Prefix Segments

In FIG. 6, an SR path connects R1 to R7 via R4. The SR path contains two prefix segments. Segment 1 is a prefix segment that causes packets to traverse the (e.g., least cost) path from R1 to R4. Segment 2 is a prefix segment that causes packets to traverse the (e.g., least cost) path from R4 to R7. In this network, assume that all links are configured with the same IGP metric (e.g., 10). Therefore, the least cost path for the first segment from R1 to R4 traverses links R1→R2, R2→R3 and R3→R4, while the least cost path for the second segment from R4 to R7 traverses links R4→R8 and R8→R7.

When R1 receives a packet from outside of the SR domain, it subjects the packet to policy. Policy may cause R1 to forward the packet through the SR path shown in FIG. 6. When this occurs, R1 imposes an MPLS label stack containing two entries. The top entry of the label stack represents segment 1 and carries the label 2001. The bottom entry of the label stack represents segment 2 and carries the label 2002. Having imposed an MPLS label stack, R1 forwards the encapsulated packet into segment 1 via link R1→R2.

When the packet arrives at R2, R2 extracts the top label (i.e., 2001) from the label stack and searches for a corresponding entry in its FIB. The corresponding FIB entry includes an instruction (i.e., SWAP—3001) and a next-hop (i.e., R3). Therefore, R2 overwrites the topmost label with a new value (i.e., 3001) and forwards the packet to R3.

When the packet arrives at R3, R3 extracts the top label (i.e., 3001) from the label stack and searches for a corresponding entry in its FIB. The corresponding FIB entry includes an instruction (i.e., POP) and a next-hop (i.e., R4).

Therefore, R3 pops the topmost entry from the label stack and forwards the packet into segment 2 via link R3→R4.

When the packet arrives at R4, R4 extracts the remaining label (i.e., 2002) from the label stack and searches for a corresponding entry in its FIB. The corresponding FIB entry includes an instruction (i.e., SWAP—3002) and a next-hop (i.e., R8). Therefore, R4 overwrites the remaining label with a new value (i.e., 3002) and forwards the packet to R8.

When the packet arrives at R8, R8 extracts the remaining label (i.e., 3002) from the label stack and searches for a corresponding entry in its FIB. The corresponding FIB entry includes an instruction (i.e., POP) and a next-hop (i.e., R7). Therefore, R8 pops the remaining entry from the label stack and forwards the packet to R7 without MPLS encapsulation.

§ 1.2.1.4.3 Penultimate Hop Popping (PHP) and the Explicit Null Label

In the examples above, each segment executes PHP procedures. That is, when a packet traverses a segment, the segment's penultimate node pops the label associated with the segment. If the SR path contains another segment, yet to be traversed, the current segment's egress node is also the ingress node of the next segment. In this case, the packet arrives at that node with the next segment's label exposed on the top of the stack. If the SR path does not contain another segment, yet to be traversed, the segment egress node is also the path egress node. In that case, the packet arrives at the path egress node without MPLS encapsulation.

In some cases, the final link in the SR path may not be able to carry the packet without MPLS encapsulation. For example, the packet may be IPv6, while the link supports IPv4 only. In order to prevent this problem, the SR ingress node can add an MPLS Explicit Null label to the top of the MPLS label stack.

When the penultimate node in the final segment pops the label associated with the final segment, it exposes the Explicit Null label. It then forwards the packet to the path egress node. The path egress node pops the Explicit Null label and continues to process the packet.

§ 1.2.1.5 Configuration and Distribution of Segment Identifiers (SIDs)

The foregoing examples described with respect to FIGS. 5 and 6 assumed that MPLS labels were distributed and each node's FIB was populated. Essentially segment routing engages interior gateway protocols ("IGPs") like Intermediate-System Intermediate-System ("IS-IS") and open shortest path first ("OSPF") for advertising two types of network segments or tunnels—(1) a strict forwarded single-hop tunnel that carries packets over a specific link between two nodes, irrespective of the link cost (referred to as "adjacency segments," which were described in § 1.2.1.3.1 above), and (2) a multihop tunnel using shortest path links between two specific nodes (referred to as "node segments," which were described in § 1.2.1.3.2 above).

Each segment is associated with an identifier, which is referred to as the segment identifier ("SID"). As already noted above, an ordered list of segments is encoded as a stack of labels. A segment can represent any instruction, topological or service-based. A segment can have a local semantic to a segment routing node or to a global node within a segment routing domain. Segment routing enforces a flow through any topological path and service chain while maintaining per-flow state only at the ingress node to the segment routing domain. Segment routing can be directly applied to the MPLS architecture with no change on the forwarding plane. A segment is encoded as an MPLS label. An ordered list of segments is encoded as a "stack" of labels or "label stack." The segment to be processed is on the top of the stack (i.e., the outermost label of the label stack). Upon completion of a segment, the related label is "popped" (i.e., removed) from the stack.

Segment routing can be applied to the IPv6 architecture, with a new type of routing extension header. A segment is encoded as an IPv6 address. An ordered list of segments is encoded as an ordered list of IPv6 addresses in the routing extension header. The segment to process is indicated by a pointer in the routing extension header. Upon completion of a segment, the pointer is incremented.

§ 1.2.1.5.1 Configurable Segment Routing Global Block

As already noted above, segment is encoded as an MPLS label. An ordered list of segments is encoded as a stack of labels. Every node in the segment routing domain is allocated labels by the node label manager based on the index range configured for source packet routing. These labels are allocated to the node segment based on the availability of the dynamic label range managed by node label manager. A segment routing global block ("SRGB") is the range of label values used in segment routing. An available SRGB label range can be configured for the IS-IS and OSPF protocols so that the labels are predictable across segment routing domains. Thus, every node in the segment routing domain is allocated labels based on the availability of the dynamic label range, and the SRGB is the range of label values reserved for segment routing. A SID may be provided as an index to be added to an SRGB base value to obtain a label value.

The IS-IS protocol creates adjacency segments per adjacency, level, and address family (one each for IPv4 and IPv6). An MPLS label is allocated for each adjacency segment that gets created. These labels are allocated after the adjacency status of the segment changes to the up state. The OSPF protocol creates adjacency segments per adjacency.

§ 1.2.2 the Border Gateway Protocol ("BGP")

In network communications system, protocols are used by devices, such as routers for example, to exchange network information. Routers generally calculate routes used to forward data packets towards a destination. Some protocols, such as the Border Gateway Protocol ("BGP"), allow routers in different autonomous systems ("ASes") to exchange reachability information.

The document "A Border Gateway Protocol 4 (BGP-4)," Request for Comments 4271 (Internet Engineering Task Force, January 2006)(referred to as "RFC 4271 and incorporated herein by reference) describes one implementation of the Border Gateway Protocol ("BGP"). BGP is an inter-Autonomous System routing protocol. The following refers to the version of BGP described in RFC 4271. The primary function of a BGP speaking system is to exchange network reachability information with other BGP systems. This network reachability information includes information on the list of Autonomous Systems (ASes) that reachability information traverses. This information is sufficient for constructing a graph of AS connectivity, from which routing loops may be pruned, and, at the AS level, some policy decisions may be enforced.

It is normally assumed that a BGP speaker advertises to its peers only those routes that it uses itself (in this context, a BGP speaker is said to "use" a BGP route if it is the most preferred BGP route and is used in forwarding).

Generally, routing information exchanged via BGP supports only the destination-based forwarding paradigm, which assumes that a router forwards a packet based solely on the destination address carried in the IP header of the packet. This, in turn, reflects the set of policy decisions that can (and cannot) be enforced using BGP.

BGP uses the transmission control protocol ("TCP") as its transport protocol. This eliminates the need to implement explicit update fragmentation, retransmission, acknowledgement, and sequencing. When a TCP connection is formed between two systems, they exchange messages to open and confirm the connection parameters. The initial data flow is the portion of the BGP routing table that is allowed by the export policy, called the "Adj-Ribs-Out."

Incremental updates are sent as the routing tables change. BGP does not require a periodic refresh of the routing table. To allow local policy changes to have the correct effect without resetting any BGP connections, a BGP speaker should either (a) retain the current version of the routes advertised to it by all of its peers for the duration of the connection, or (b) make use of the Route Refresh extension.

KEEPALIVE messages may be sent periodically to ensure that the connection is live. NOTIFICATION messages are sent in response to errors or special conditions. If a connection encounters an error condition, a NOTIFICATION message is sent, and the connection is closed.

A BGP peer in a different AS is referred to as an external peer, while a BGP peer in the same AS is referred to as an internal peer. Internal BGP and external BGP are commonly abbreviated as iBGP and eBGP, respectively. If a BGP session is established between two neighbor devices (i.e., two peers) in different autonomous systems, the session is external BGP (eBGP), and if the session is established between two neighbor devices in the same AS, the session is internal BGP (iBGP).

If a particular AS has multiple BGP speakers and is providing transit service for other ASes, then care must be taken to ensure a consistent view of routing within the AS. A consistent view of the interior routes of the AS is provided by the IGP used within the AS. In some cases, it is assumed that a consistent view of the routes exterior to the AS is provided by having all BGP speakers within the AS maintain interior BGP ("iBGP") with each other.

Many routing protocols have been designed to run within a single administrative domain. These are known collectively as "Interior Gateway Protocols" ("IGPs"). Typically, each link within an AS is assigned a particular "metric" value. The path between two nodes can then be assigned a "distance" or "cost", which is the sum of the metrics of all the links that belong to that path. An IGP typically selects the "shortest" (minimal distance, or lowest cost) path between any two nodes, perhaps subject to the constraint that if the IGP provides multiple "areas", it may prefer the shortest path within an area to a path that traverses more than one area. Typically, the administration of the network has some routing policy that can be approximated by selecting shortest paths in this way.

BGP, as distinguished from the IGPs, was designed to run over an arbitrarily large number of administrative domains ("autonomous systems" or "ASes") with limited coordination among the various administrations. Both iBGP and IGP typically run simultaneously on devices of a single AS and complement each other. The BGP speaker that imports network destination reachability from an eBGP session to iBGP sessions, sets the BGP Next Hop attribute in an iBGP update. The BGP NH attribute is an IP address. Other iBGP speakers within the AS, upon recipient of the above iBGP update, consult IGP for reachability of BGP NH and its cost. If BGP NH is unreachable, the entire iBGP update is invalid. Otherwise, the IGP cost of reaching BGP NH is considered during BGP best path selection.

§ 1.2.2.1 Example Environment

FIG. 7 illustrates an example environment 700 in which the present invention may be used. The example environment 700 includes multiple autonomous systems (ASes 710*a*, 710*b*, . . . 710*c*). The ASes 710*a*-710*c* include BGP routers 705*a*-705*e*. BGP routers within an AS generally run iBGP, while BGP routers peering with a BGP router in another AS generally run eBGP. As shown, BGP router 705*b* and 705*c* are peers (also referred to as "BGP speakers") in a BGP session (depicted as 720). During the BGP session 720, the BGP speakers 705*b* and 705*c* may exchange BGP UPDATE messages. Details of the BGP UPDATE message 790 are described in § 1.2.1.2 below.

§ 1.2.2.2 BGP "Update" Messages

In BGP, UPDATE messages are used to transfer routing information between BGP peers. The information in the UPDATE message can be used to construct a graph that describes the relationships of the various Autonomous Systems. More specifically, an UPDATE message is used to advertise feasible routes that share a common set of path attribute value(s) to a peer (or to withdraw multiple unfeasible routes from service). An UPDATE message MAY simultaneously advertise a feasible route and withdraw multiple unfeasible routes from service.

The UPDATE message 790 includes a fixed-size BGP header, and also includes the other fields, as shown in FIG. 7. (Note some of the shown fields may not be present in every UPDATE message). Referring to FIG. 7, the "Withdrawn Routes Length" field 730 is a 2-octets unsigned integer that indicates the total length of the Withdrawn Routes field 740 in octets. Its value allows the length of the Network Layer Reachability Information ("NLRI") field 770 to be determined, as specified below. A value of 0 indicates that no routes are being withdrawn from service, and that the WITHDRAWN ROUTES field 740 is not present in this UPDATE message 790.

The "Withdrawn Routes" field 740 is a variable-length field that contains a list of IP address prefixes for the routes that are being withdrawn from service. Each IP address prefix is encoded as a 2-tuple 740' of the form <length, prefix>. The "Length" field 742 indicates the length in bits of the IP address prefix. A length of zero indicates a prefix that matches all IP addresses (with prefix, itself, of zero octets). The "Prefix" field 744 contains an IP address prefix, followed by the minimum number of trailing bits needed to make the end of the field fall on an octet boundary. Note that the value of trailing bits is irrelevant.

Still referring to FIG. 7, the "Total Path Attribute Length" field 750 is a 2-octet unsigned integer that indicates the total length of the Path Attributes field 760 in octets. Its value allows the length of the Network Layer Reachability Information ("NLRI") field 770 to be determined. A value of 0 indicates that neither the Network Layer Reachability Information field 770 nor the Path Attribute field 760 is present in this UPDATE message.

The "Path Attributes" field 760 is a variable-length sequence of path attributes that is present in every UPDATE message, except for an UPDATE message that carries only the withdrawn routes. Each path attribute is a triple <attribute type, attribute length, attribute value> of variable length. The "Attribute Type" is a two-octet field that consists of the Attribute Flags octet, followed by the Attribute Type Code octet.

Finally, the "Network Layer Reachability Information" field 770 is a variable length field that contains a list of Internet Protocol ("IP") address prefixes. The length, in octets, of the Network Layer Reachability Information is not encoded explicitly, but can be calculated as: UPDATE message Length−23−Total Path Attributes Length (Recall field 750.)−Withdrawn Routes Length (Recall field 730.) where UPDATE message Length is the value encoded in the fixed-size BGP header, Total Path Attribute Length, and Withdrawn Routes Length are the values encoded in the variable part of the UPDATE message, and 23 is a combined length of the fixed-size BGP header, the Total Path Attribute Length field, and the Withdrawn Routes Length field.

Reachability information is encoded as one or more 2-tuples of the form <length, prefix> 770', whose fields are shown in FIG. 7 and described here. The "Length" field 772 indicates the length in bits of the IP address prefix. A length of zero indicates a prefix that matches all IP addresses (with prefix, itself, of zero octets). The "Prefix" field 774 contains an IP address prefix, followed by enough trailing bits to make the end of the field fall on an octet boundary. Note that the value of the trailing bits is irrelevant.

Referring to FIG. 7B, "Multiprotocol Extensions for BGP-4," Request for Comments 4760 (Internet Engineering Task Force, January 2007) (referred to as "RFC 4760" and incorporated herein by reference) describes a way to use the path attribute(s) field 760 of a BGP UPDATE message 700 to carry routing information for multiple Network Layer protocols (such as, for example, IPv6, IPX, L3VPN, etc.). More specifically, RFC 4760 defines two new path attributes: (1) Mulitprotocol Reachable NLRI ("MP_Reach_NLRI"); and (2) Multiprotocol Unreachable NLRI ("MP_Unreach_NLRI"). The first is used to carry the set of reachable destinations together with next hop information to be used for forwarding to these destinations, while the second is used to carry a set of unreachable destinations. Only MP_Reach_NLRI is discussed below.

Referring to FIG. 7B, the MP_Reach_NLRI "path attribute" 760' includes an address family identifier ("AFI") (2 octet) field 761, a subsequent address family identifier ("SAFI") (1 octet) field 762, a length of Next Hop Network Address (1 octet) field 763, a Network Address of Next Hop (variable) field 764, a Reserved (1 octet) field 765 and a Network Layer Reachability Information (variable) field 766. The AFI and SAFI fields 761 and 762, in combination, identify (1) a set of Network Layer protocols to which the address carried in the Next Hop field 764 must belong, (2) the way in which the address of the Next Hop is encoded, and (3) semantics of the NLRI field 766. The Network Address of Next Hop field 764 contains the Network Address of the next router on the path to the destination system. The NLRI field 766 lists NLRI for feasible routes that are being advertised in the path attribute 760. That is, the next hop information carried in the MP_Reach_NLRI 760' path attribute defines the Network Layer address of the router that should be used as the next hope to the destination(s) listed in the MP_NLRI attribute in the BGP UPDATE message.

An UPDATE message can advertise, at most, one set of path attributes (Recall field 760.), but multiple destinations, provided that the destinations share the same set of attribute value(s). All path attributes contained in a given UPDATE message apply to all destinations carried in the NLRI field 770 of the UPDATE message.

As should be apparent from the description of fields 730 and 740 above, an UPDATE message can list multiple routes that are to be withdrawn from service. Each such route is identified by its destination (expressed as an IP prefix), which unambiguously identifies the route in the context of the BGP speaker—BGP speaker connection to which it has been previously advertised.

An UPDATE message might advertise only routes that are to be withdrawn from service, in which case the message will not include path attributes 760 or Network Layer Reachability Information 770. Conversely, an UPDATE message might advertise only a feasible route, in which case the WITHDRAWN ROUTES field 740 need not be present. An UPDATE message should not include the same address prefix in the WITHDRAWN ROUTES field 740 and Network Layer Reachability Information field 770 or "NLRI" field in the MP_REACH_NLRI path attribute field 766.

§ 1.2.3 Using BGP to Bind MPLS Labels to Address Prefixes

The document, "Using BGP to Bind MPLS Labels to Address Prefixes," Request for Comments 8277 (Internet Engineering Task Force, October 2017) (referred to as "RFC 8277" and incorporated herein by reference) specifies procedures for using BGP to advertise that a specified router has bound a specified MPLS label, or a specified sequence of MPLS labels organized as a contiguous part of a label stack, to a specified address prefix. Referring to FIGS. 7B-7D, this can be done by sending a BGP UPDATE message whose NLRI field 766/766'/766" contains both the prefix 778/778' and the MPLS labels(s) 774/774' and whose Next Hop field 764 identifies the node at which the prefix 778/778' is bound to the label(s) 774/774'.

More specifically, referring to FIG. 7C, § 2.2 of RFC 8277 describes NLRI encoding when the multiple labels capability is not used. If the multiple labels capability has not been both sent and received on a given BGP session, then in a BGP UPDATE on that session whose MP_REACH_NLRI attribute contains one of the AFI/SAFI combinations specified in § 2 of RFC 8277, the NLRI field is encoded as shown in FIG. 7C. More specifically, the 8-bit length field 722d specifies the length in bits of the remainder of the NLRI field 766'. Note that the length will always be the sum of 20 (number of bits in Label field), plus 3 (number of bits in RSV field), plus 1 (number of bits in S field), plus the length in bits of the prefix, rounded up to the nearest integral number of octets. The 20-bit label field 774 contains an MPLS label value. The 3-bit RSV field 776 should be set to zero on transmission and is ignored on reception. The 1-bit S field 777 is set to one on transmission and is ignored on reception.

The UPDATE message not only advertises the binding between the prefix 778 and the label 774; it also advertises a path to the prefix via the node identified in the Network Address of Next Hop field 764 of the MP_REACH_NLRI attribute.

Further, referring to FIG. 7D, § 2.3 of RFC 8277 specifies NLRI encoding when the multiple labels capability is used if the multiple labels capability has been both sent and received on a given BGP session. In a BGP UPDATE on that session whose MP_REACH_NLRI attribute contains one of the AFI/SAFI combinations specified in § 2 of RFC 8277, the NLRI field 766" is encoded as shown in FIG. 7D. More specifically, the 8-bit length field 772' specifies the length in bits of the remainder of the NLRI field 766". Note that for each label, the length is increased by 24 bits (20 bits in the label field 774', plus 3 bits in the RSV field 776', plus 1 bit in the S field 777'). As shown, a number of entries 780 may each include a 20-bit label field 774' containing an MPLS label value, a 3-bit RSV field 776' that should be set to zero on transmission and is ignored on reception, and a 1-bit S field 777'. In all labels except the last one (i.e., in all labels except the one immediately preceding the prefix), the S bit 777' is set to 0. In the last label, the S bit 777' is set to one 1. Note that the S bit set in the last label is used to parse the NLRI correctly.

The UPDATE message not only advertises the binding between the prefix 778' and the labels 774'; it also advertises a path to the prefix 778' via the node identified in the Next Hop field 764 of the MP_REACH_NLRI attribute.

§ 1.2.4 BGP Peering and Data Stores: The Conventional "RIB" Model

FIG. 8 is a diagram illustrating a conventional BGP RIB model in which a BGP speaker interacts with other BGP speakers (peers). (Recall, for example, that in FIG. 7A, BGP routers 705*b* and 705*c* are peers (also referred to as "BGP speakers") in a BGP session (depicted as 720).) In FIG. 8, a BGP peer 810 has a session with one or more other BGP peers 850. The BGP peer 810 includes an input (for example, a control plane interface, not shown) for receiving, from at least one outside BGP speaker 850, incoming routing information 820. The received routing information is stored in Adj-RIBS-In storage 812. The information stored in Adj-RIBS-In storage 812 is used by a decision process 814 for selecting routes using the routing information. The decision process 814 generates "selected routes" as Loc-RIB information 816, which is used to construct forwarding database. The Loc-RIB information 816 that is to be advertised further to other BGP speakers is then stored in Adj-RIBS-Out storage 818. As shown by 830, at least some of the information in Adj-RIBS-Out storage is then provided to at least one outside BGP speaker peer device 850 in accordance with a route advertisement process.

Referring to communications 820 and 830, recall that BGP can communicate updated route information using the BGP UPDATE message.

More specifically, RFC 4271 documents a current version of the BGP routing protocol. In it, the routing state of BGP is abstractly divided into three (3) related data stores (historically referred to as "information bases") that are created as part of executing the BGP pipeline. To reiterate, the Adj-RIBS-In 812 describes the set of routes learned from each (adjacent) BGP peer 850 for all destinations. The Loc-RIB 816 describes the result of the BGP decision process 816 (which may be thought of loosely as route selection) in choosing a best BGP route and other feasible (e.g., valid but not best) alternate routes. The Adj-RIB S-Out 818 describes the process of injecting the selected route from the Loc-RIB 816 (or possibly a foreign route from another protocol) and placing it for distribution to (adjacent) BGP peers 850 using the BGP protocol (Recall, e.g. the UPDATE messages 790/830.).

§ 1.2.5 Limitations when Using BGP to Bind MPLS Labels to Address Prefixes

Section 3 of RFC 8277 discusses installing and propagating SAFI-4 (e.g., IPv4 or IPv6) routes and SAFI-128 (VPN-IPv4 or VPN IPv6) routes. (Recall, e.g., field 762 of FIG. 7B, and see, e.g., § 2 of RFC 8277.) More specifically, § 3.2.1 of RFC 8277 describes modification of label field(s) 774/774' when the value in the next hop field 764 is unchanged, while § 3.2.2 of RFC 8277 describes modification of label field(s) 774/774' when the value in the next hop field 764 has changed. Assume a scenario in which the value in the next hop field 764 is changed.

Currently, responsive to receiving a labeled NLRI path (e.g., a label-address prefix binding) from a downstream peer, the BGP speaker generates a new BGP UPDATE by (1) modifying the BGP Next Hop attribute 760/764, and (2) replacing the entire label sequence 774/774' in the NLRI 766'/766" by single locally assigned label. (See, e.g., RFC 8277.) The BGP speaker then re-advertises the new BGP UPDATE message to an upstream peer. In addition, the BGP speaker also programs its data-plane MPLS forwarding information base (FIB) with an appropriate entry in which a key to the FIB entry is a local label and an operation of the FIB entry is "swap" (or "swap-push") of label(s) (as learned from downstream peer).

Such operations may result in assigning a unique label for every labeled prefix. This may cause problems as there are many types of labeled prefixes, and more types expected (e.g., IPv4, IPv6, VPNv4, VPNv6, colored-IPv4, colored-IPv6, those defined in the draft, "Inter-Domain Traffic Steering with BGP Labeled Colored Unicast (BGP-LCU)," draft-szarecki-idr-bgp-lcu-traffic-steering-00 (Internet Engineering Task Force, Jul. 7, 2019)(incorporated herein by reference), etc.). Consequently, in large multi-domain networks, the number of labeled prefixes may exceed the supported label space of given BGP speaker data-plane (and may even exceed the entire $2^{20}$ label space). That is, the particular device may not be able to hold $2^{20}$ (~1 million) MPLS FIB entries due to its data-plane hardware limitations (e.g., size of content addressable memory (CAM) and/or static random access memory (SRAM), microcode limitations, etc.). Further, the entire label space supported by given device (even if it covers all $2^{20}$ labels) may be carved to blocks that belong to specific applications, thereby allocating only part of entire label space for BGP carrying labeled prefixes. For example, a block might be reserved for static allocation by management plane, or another block might be reserved for allocation by controller, etc. Finally, the use of colored-IP prefixes increases label usage. This is because for each IP destination, as many label as supported colors may need to be allocated. Considering that networks of 100,000 edge nodes are currently in operation without colors, introduction of network slicing (with say 10 slices) with colors used to identify each slice would increase the number of labels needed multiple times (e.g., 100,000 edge nodes with 10 colors may consume 1 million labels).

Further, the time that may be needed to re-program a large number of MPLS FIB entries in data-plane in case of routing re-convergence event might become excessive and limit scalability.

As should be appreciated from the foregoing, it would be useful to improve the use and processing of update messages (e.g., BGP UPDATEs) that bind (e.g., MPLS) labels to address prefixes such that labels are used more efficiently, such that the number of MPLS FIB entries to be reprogrammed is reduced, and/or such that such update messages can be processed more efficiently.

§ 2. SUMMARY OF THE INVENTION

Example embodiments consistent with the present description improve the use and processing of update messages (e.g., BGP UPDATEs) that bind (e.g., MPLS) labels to address prefixes such that labels are used more efficiently, and/or such that such update messages can be processed more efficiently. Such example embodiments may do so as follows. A distance vector control signaling protocol (e.g., BGP) peer device receives a control plane message (e.g., a BGP Update) from a downstream peer device, the control plane message including (1) a network address of the downstream device as a next hop value, (2) a prefix value, and (3) at least one label associated with the prefix value. Responsive to receiving the control plane message, the peer device generates a new control plane (e.g., BGP Update) message including (1) a network address of the peer device as a next hop value, (2) the prefix value from the control plane message, and (3) a label stack including (i) the label(s) from the control plane message, and (ii) a local label associated with the peer device. The peer device then sends the new control plane message to an upstream peer device.

Responsive to receiving the control plane message, the peer device may further add an entry to a forwarding information base (FIB) in its data-plane, the entry including (1) the local label as a key, and (2) a forwarding operation associated with the local label.

In some example embodiments consistent with the present description, the forwarding operation is one of (i) pop and forward, (ii) swap and forward, or (iii) pop, encapsulate and forward.

In some example embodiments consistent with the present description, if the BGP message was received by the BGP peer device from the downstream BGP peer device over a single hop BGP session in which the next hop value is an address belonging to locally attached network, then the forwarding operation is pop and forward over an egress interface that connects the BGP peer directly to the downstream BGP peer.

In some example embodiments consistent with the present description, if the BGP message was received by the BGP peer device from the downstream BGP peer device over a multi-hop BGP session in which a MPLS tunnel (LSP) is used by BGP peer device to resolve the next hop value, then the forwarding operation is a swap and forward.

In some example embodiments consistent with the present description, if the BGP message was received by the BGP peer device from the downstream BGP peer device over a multi-hop BGP session in which a non-MPLS tunnel is used by BGP peer device to resolve the next hop value, then the forwarding operation is a pop, encapsulate and forward.

In some example embodiments consistent with the present description, if the BGP peer device is configured with an explicit label value binding for the network address of the downstream BGP device provided as the next hop value, then the local label is set to the explicit label value binding.

In some example embodiments consistent with the present description, if the next hop value is resolved via a tunnel that has a binding segment identifier (BSID) value, then the local label is set to the BSID value.

In some example embodiments consistent with the present description, if the next hop value is resolved via tunnel that is instantiated by processing one of (i) a prefix segment identifier (SID), (ii) a node SID, or (iii) an anycast SID, the BGP peer device has a Segment Routing Global Block (SRGB) which defines a range of label values reserved for segment routing, and then the local label is derived from the SRGB of the BGP peer device.

In some example embodiments consistent with the present description, if the BGP peer device has previously allocated local label for a tunnel used for resolution of the next hop value, then the local label is set to the previously allocated local label.

In some example embodiments consistent with the present description, if the BGP peer device has a dynamic label block, then the local label is assigned one of available labels of the dynamic label block.

§ 3. BRIEF DESCRIPTION OF THE DRAWINGS

FIGS. 7A-7D illustrate border gateway protocol (BGP) message formats, and parts of such BGP messages.

FIGS. 13A and 13B is an example of operations of the example architecture of FIG. 12.

§ 4. DETAILED DESCRIPTION

Figure 1:
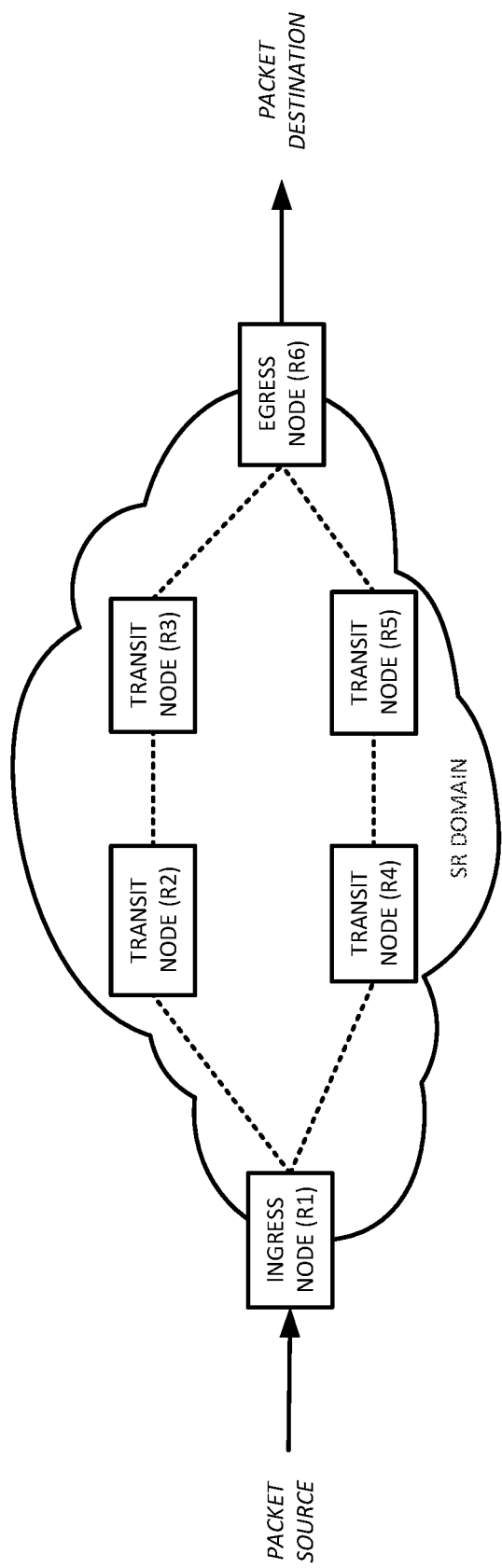
FIG. 1 is an example network used to illustrate an SR domain.
Figure 2:
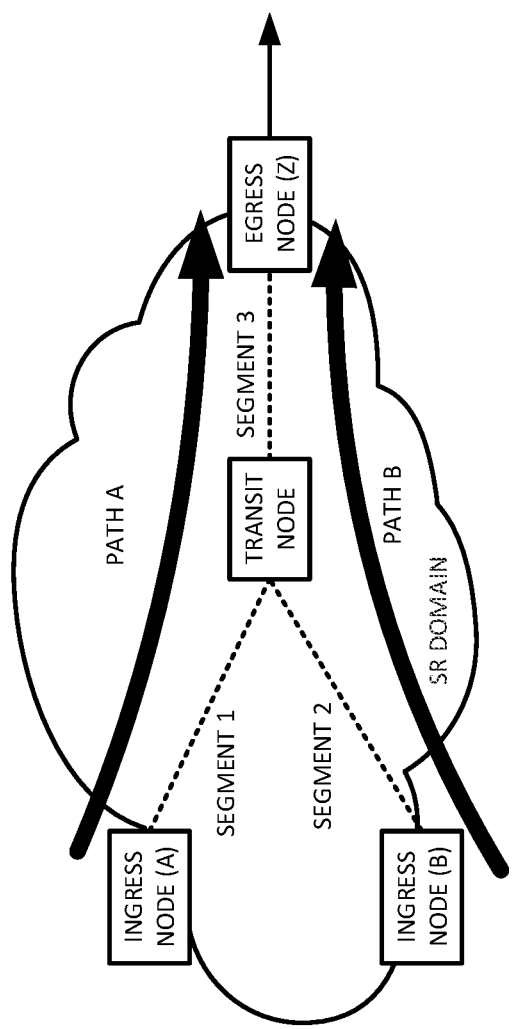
FIG. 2 is an example network used to illustrate SR paths through an SR domain.
Figure 3:
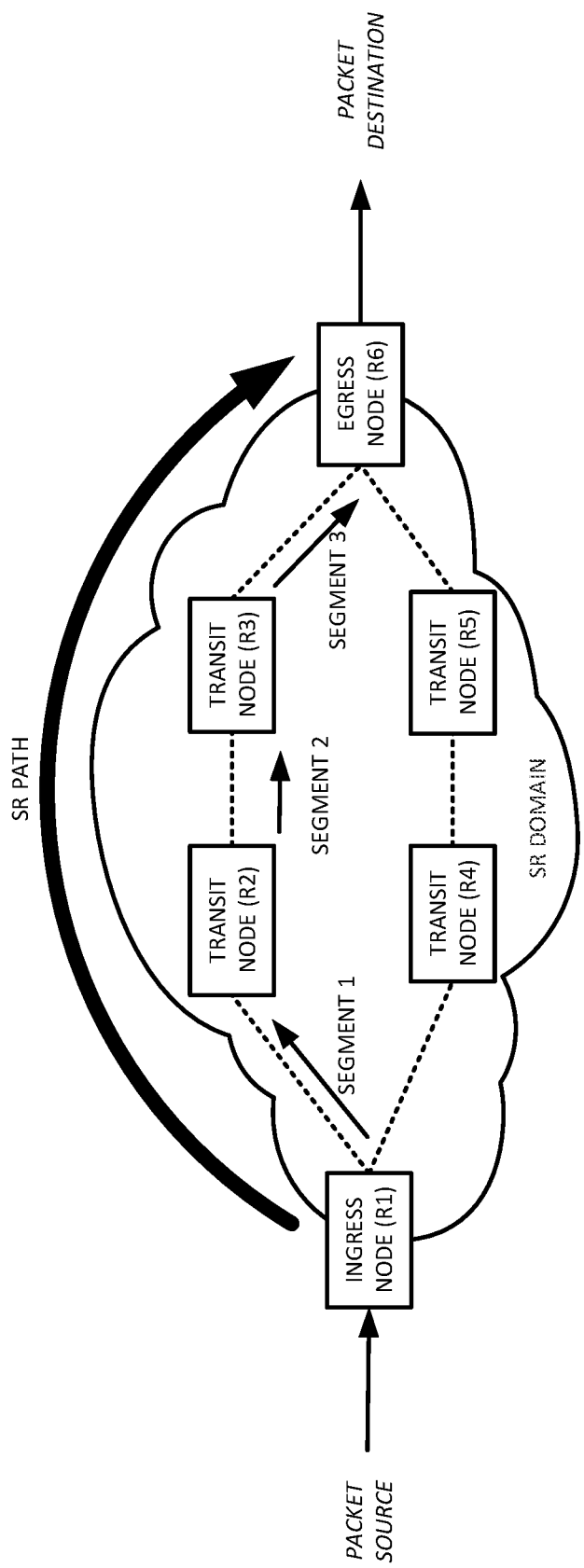
FIG. 3 is an example network used to illustrate adjacency segments in an SR domain.
Figure 4A:
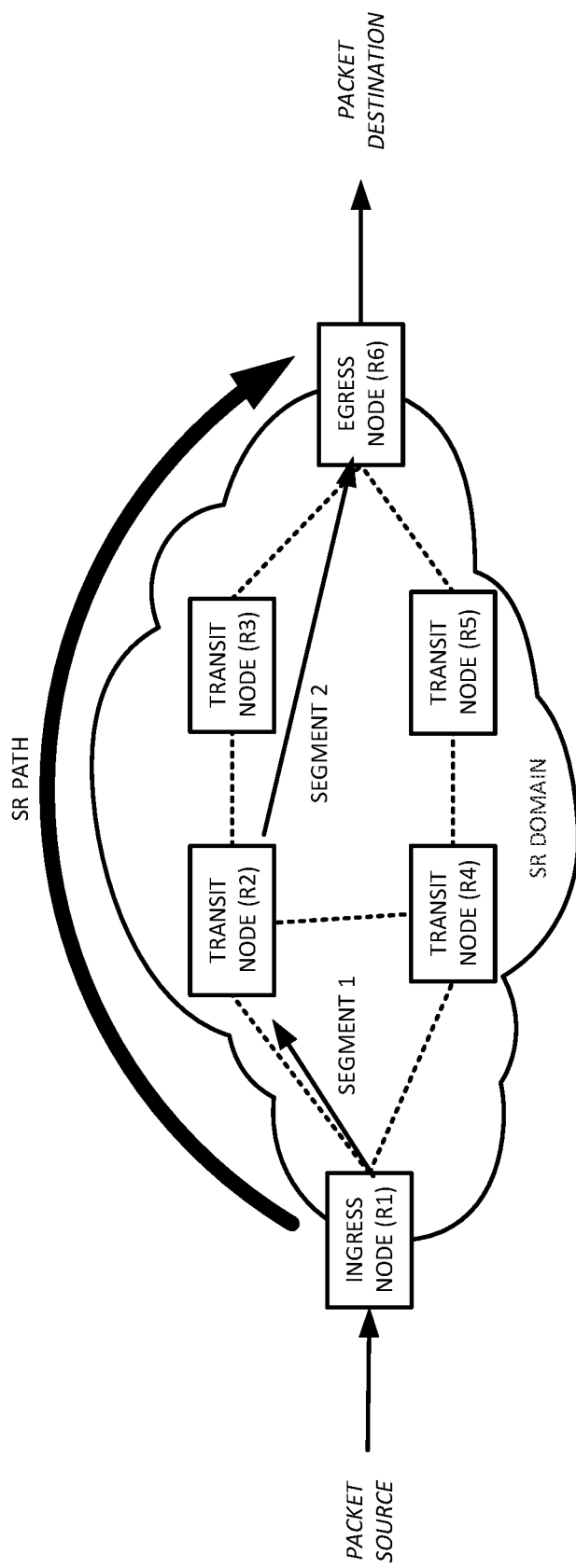
FIGS. 4A and 4B are an example network used to illustrate prefix segments in an SR domain.
Figure 4B:
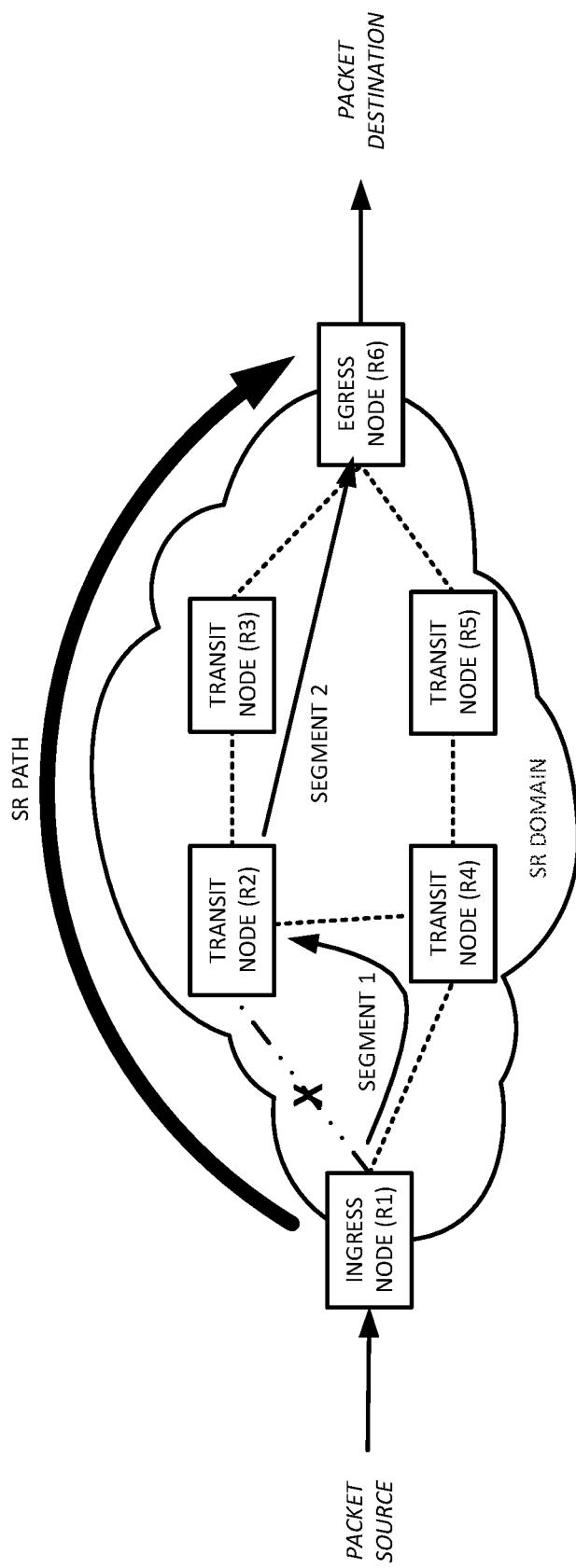
Figure 5:
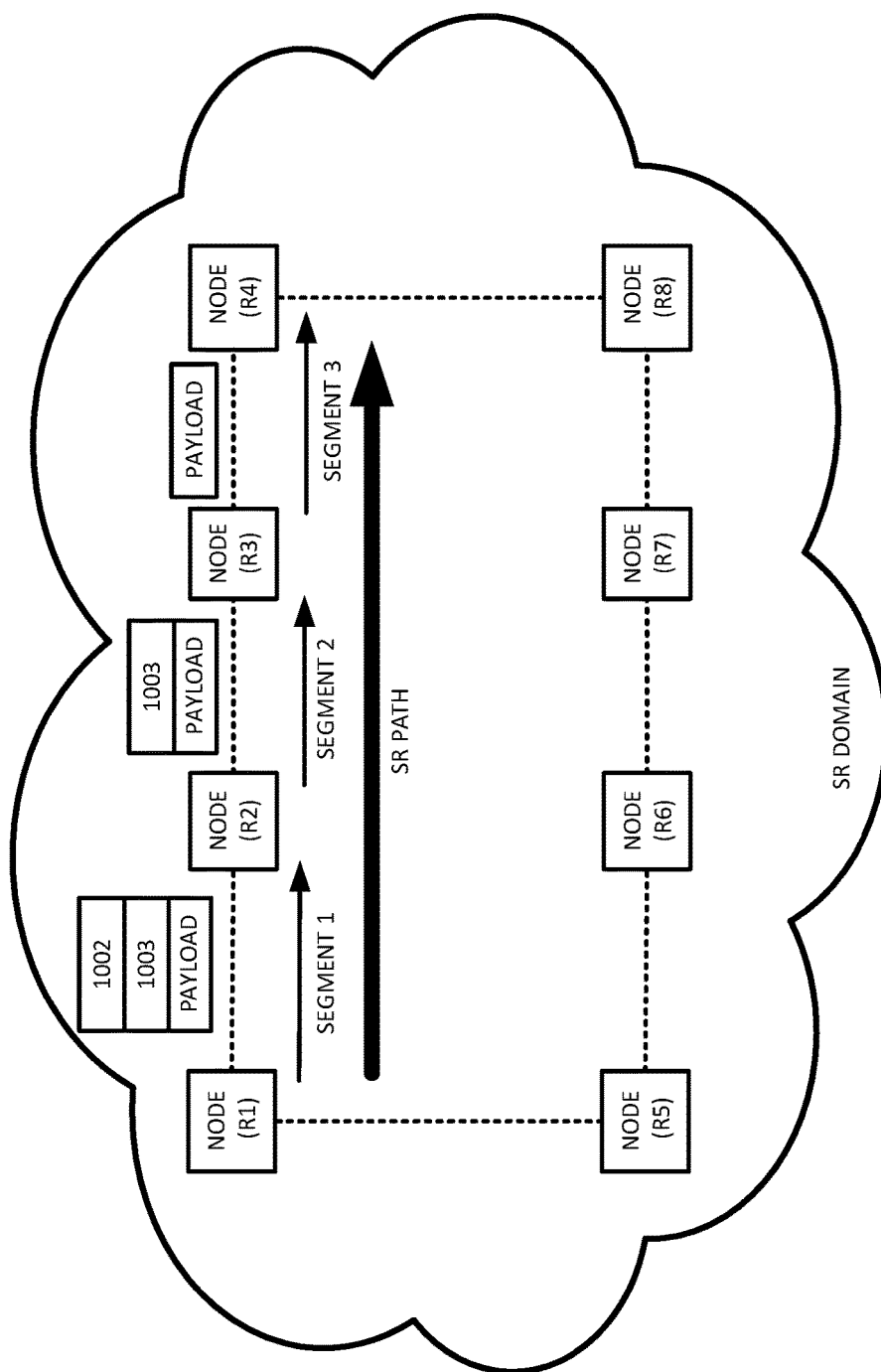
FIG. 5 is an example network used to illustrate the use of MPLS labels derived from adjacency segments.
Figure 6:
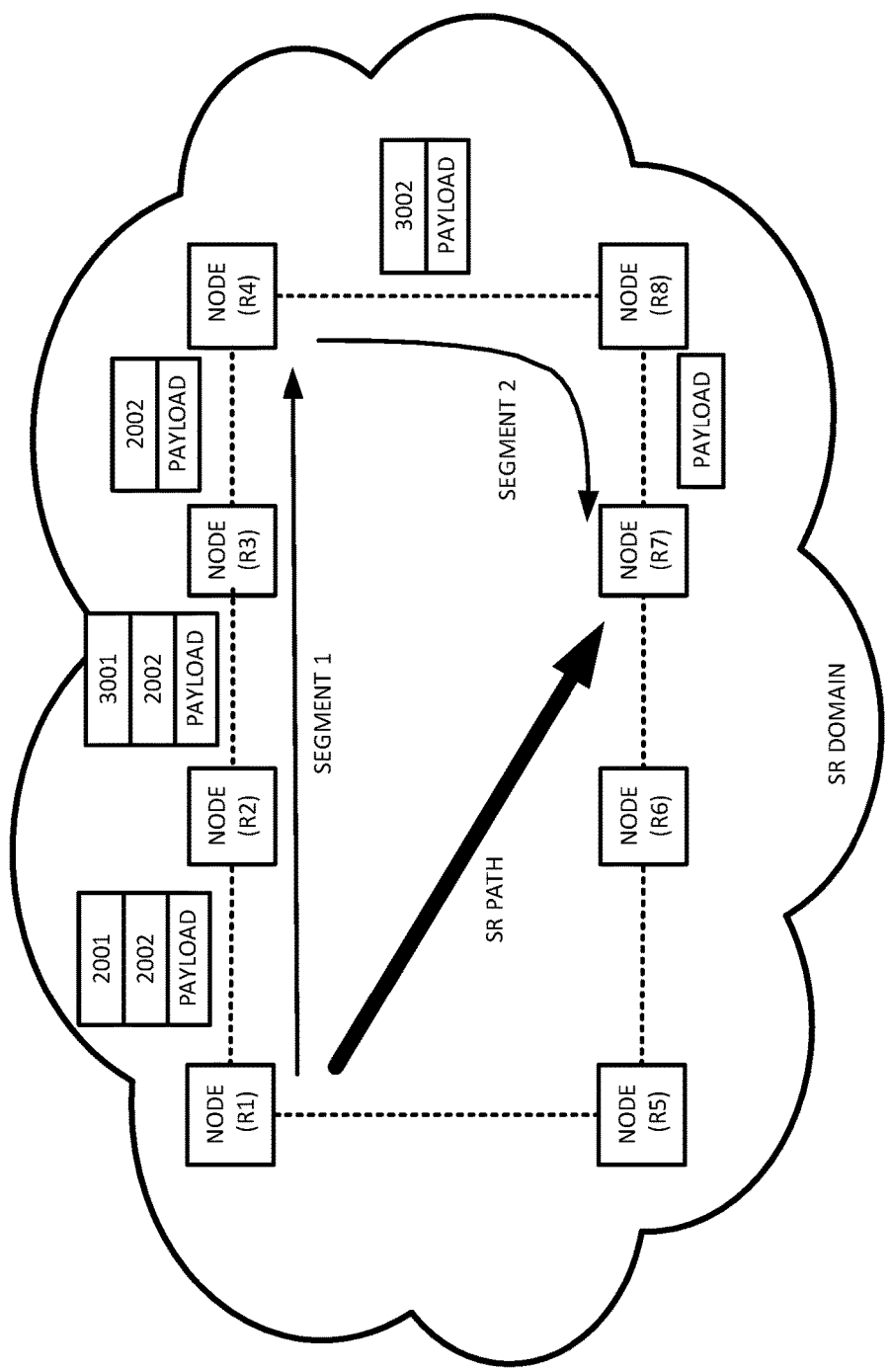
FIG. 6 is an example network used to illustrate the use of MPLS labels derived from prefix segments.
Figure 7A:
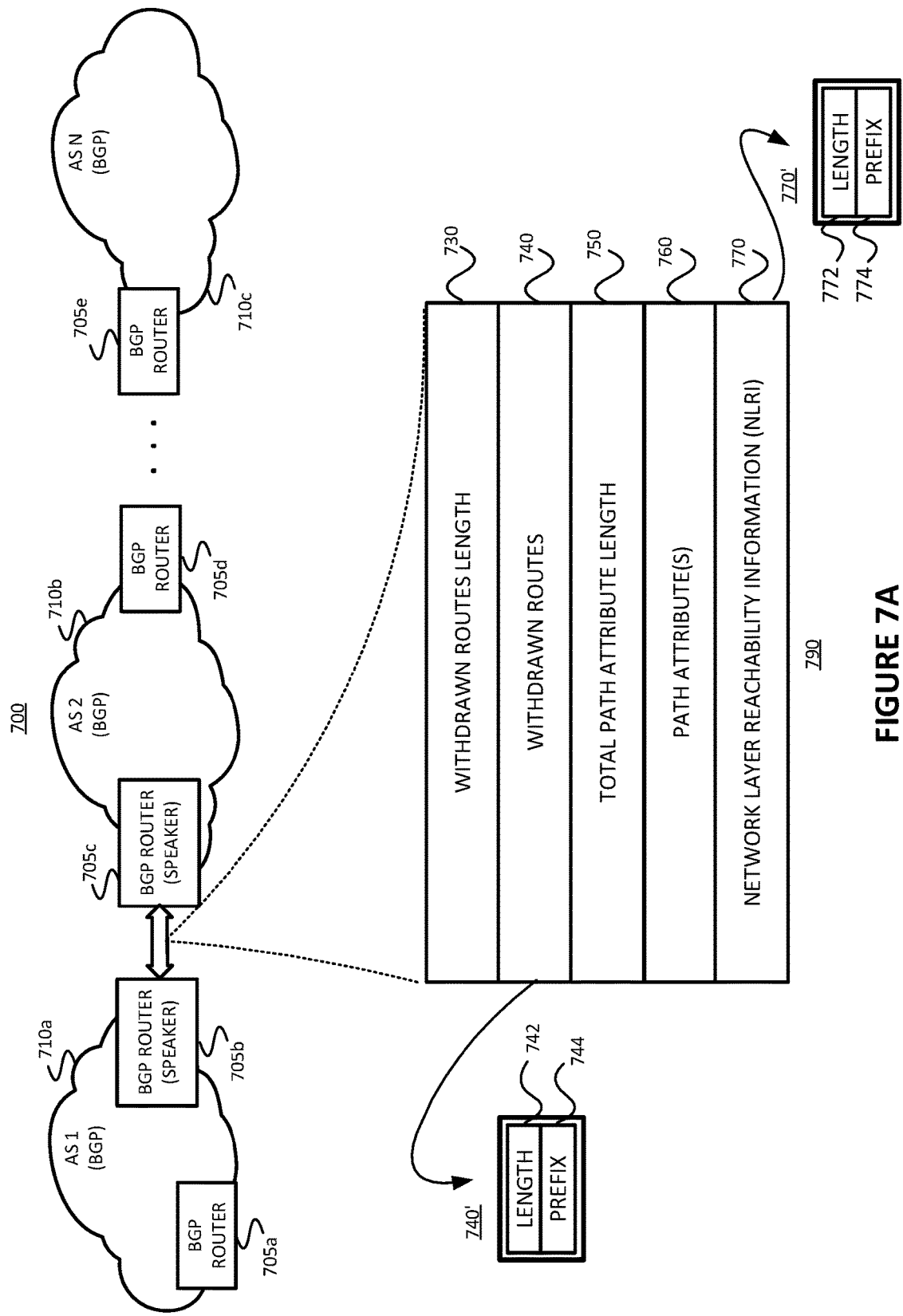
Figure 8:
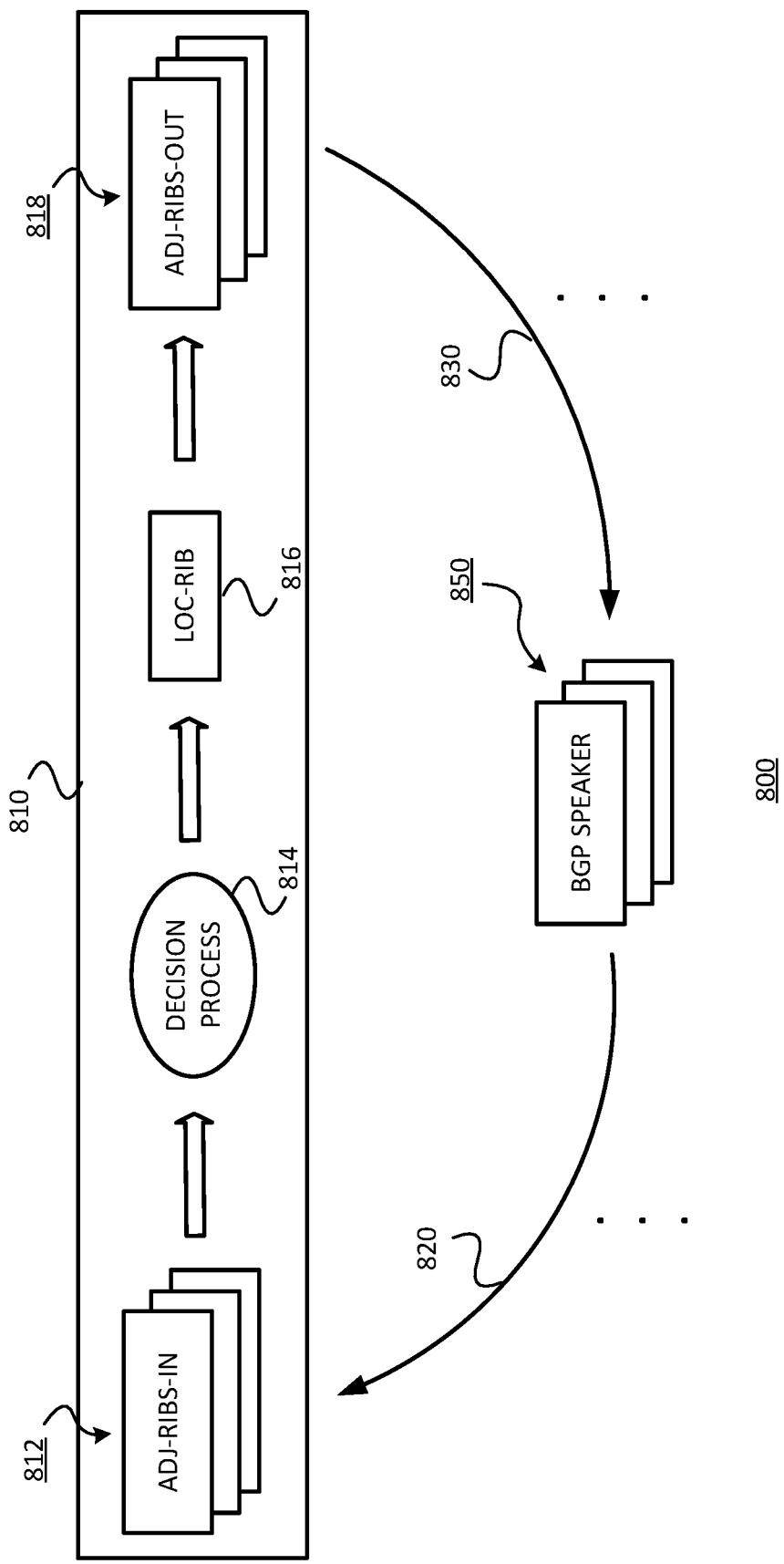
FIG. 8 is a diagram illustrating a conventional BGP RIB model in which a BGP speaker interacts with other BGP speakers (peers).

The present disclosure may involve novel methods, apparatus, message formats, and/or data structures for improving the use and processing of update messages (e.g., BGP UPDATES) that bind (e.g., MPLS) labels to address prefixes such that labels are used more efficiently, and/or such that such update messages can be processed more efficiently. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 Definitions

Adj-RIB-In: The Adj-RIBS-In contains unprocessed routing information that has been advertised to the local BGP speaker by its peers.

Adj-RIB-Out: The Adj-RIBS-Out contains the routes for advertisement to specific peers by means of the local speaker's UPDATE messages.

Autonomous System (AS): The classic definition of an Autonomous System is a set of routers under a single technical administration, using an interior gateway protocol (IGP) and common metrics to determine how to route packets within the AS, and using an inter-AS routing protocol to determine how to route packets to other ASes. Since this classic definition was developed, it has become common for a single AS to use several IGPs and, sometimes, several sets of metrics within an AS. The use of the term Autonomous System stresses the fact that, even when multiple IGPs and metrics are used, the administration of an AS appears to other ASes to have a single coherent interior routing plan, and presents a consistent picture of the destinations that are reachable through it.

BGP Identifier: A 4-octet unsigned integer that indicates the BGP Identifier of the sender of BGP messages. A given BGP speaker sets the value of its BGP Identifier to an IP address assigned to that BGP speaker. The value of the BGP Identifier is determined upon startup and is the same for every local interface and BGP peer.

BGP speaker: A router that implements BGP.

Downstream: In a direction from an ingress to an egress of a label-switched path (LSP). In general, route propagation from one BGP speaker to another is governed by the update-send process. (See, e.g., § 9.2 of RFC 4271.) The sender of a BGP Update is commonly referred to as the downstream peer and the receiver of a BGP Update is commonly referred to as the upstream peer.

EBGP: External BGP (BGP connection between external peers).

External peer: Peer that is in a different Autonomous System than the local system.

Feasible route: An advertised route that is available for use by the recipient.

FIB: Forwarding Information Base

IBGP: Internal BGP (BGP connection between internal peers).

Internal peer: Peer that is in the same Autonomous System as the local system.

IGP: Interior Gateway Protocol—a routing protocol used to exchange routing information among routers within a single Autonomous System.

Loc-RIB: The Loc-RIB contains the routes that have been selected by the local BGP speaker's Decision Process.

NLRI: Network Layer Reachability Information.

Prefix: A portion of a network (e.g., layer 3) address, such as a portion of an Internet address, IP-VPN address, colored-Internet address, etc.

Route: A unit of information that pairs a set of destinations with the attributes of a path to those destinations. The set of destinations are systems whose IP addresses are contained in one IP address prefix carried in the Network Layer Reachability Information (NLRI) field of an UPDATE message. The path is the information reported in the path attributes field of the same UPDATE message.

RIB: Routing Information Base.

RSVP: Resource Reservation Protocol

SID: Segment Identifier

Upstream: In a direction from an egress to an ingress of a label-switched path (LSP).

§ 4.2 Example Methods

Figure 9:
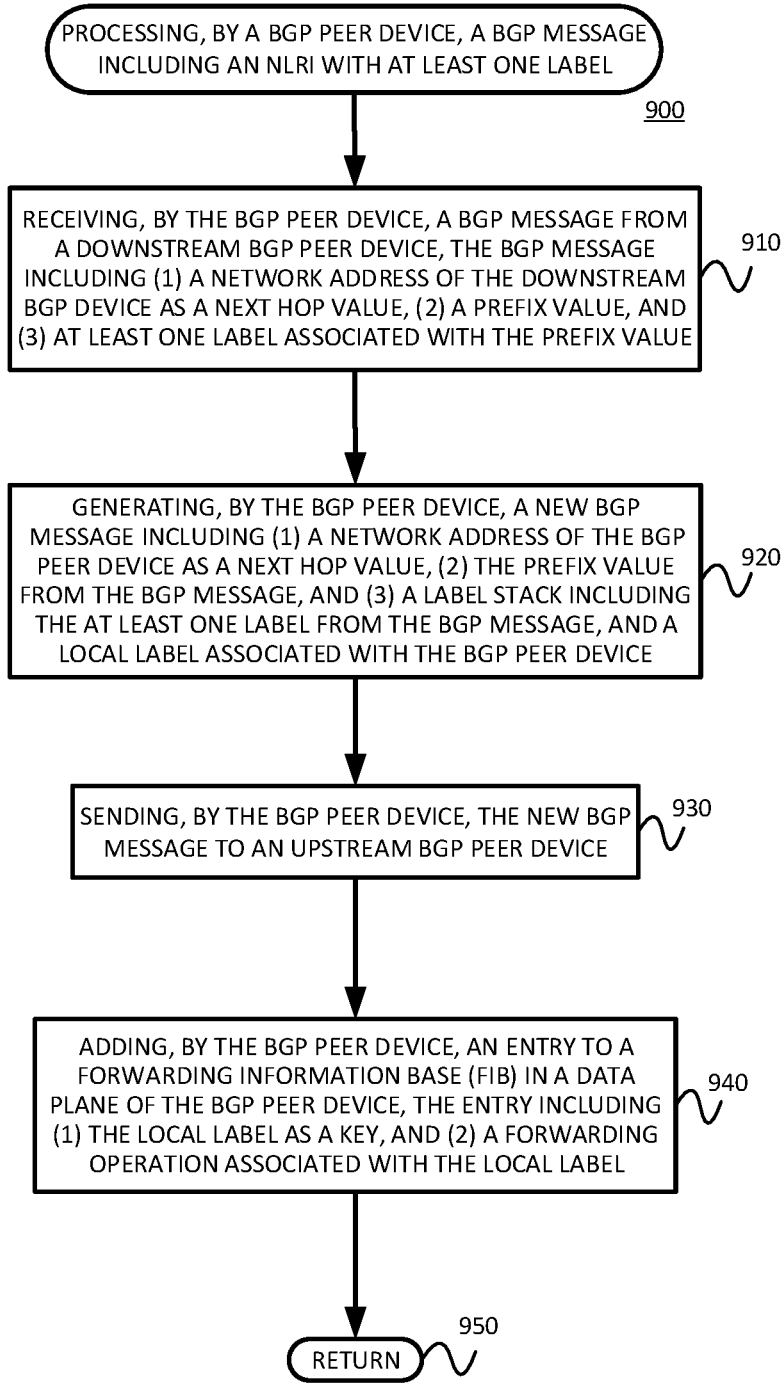
FIG. 9 is a flow diagram of an example method for processing, by a BGP peer device, a BGP message including an NLRI with at least one label.

FIG. 9 is a flow diagram of an example method 900 for processing, by a BGP peer device, a BGP message including an NLRI with at least one label. As shown, the BGP peer device receives a BGP message from a downstream BGP peer device. (Block 910) The BGP message includes (1) a network address of the downstream BGP device as a next hop value, (2) a prefix value, and (3) at least one label associated with the prefix value. Responsive to receiving the BGP message, the BPG peer device then generates a new BGP message (Block 920) and sends the new message to an upstream BGP peer device (Block 930). The new BGP message includes (1) a network address of the BGP peer device as a next hop value, (2) the prefix value from the BGP message, and (3) a label stack including the label(s) from the BGP message received, and (ii) a local label associated with the BGP peer device.

Responsive to advertising the BGP message, the BGP peer device may further add an entry to a forwarding information base (FIB) in its data-plane. (Block 940) The FIB entry may include (1) the local label as a key, and (2) a forwarding operation associated with the local label. Still referring to block 940, the forwarding operation may be, for example, one of (i) pop and forward, (ii) swap and forward, or (iii) pop, encapsulate into tunnel and forward.

§ 4.3 Example Architectures and Apparatus

Figure 10:
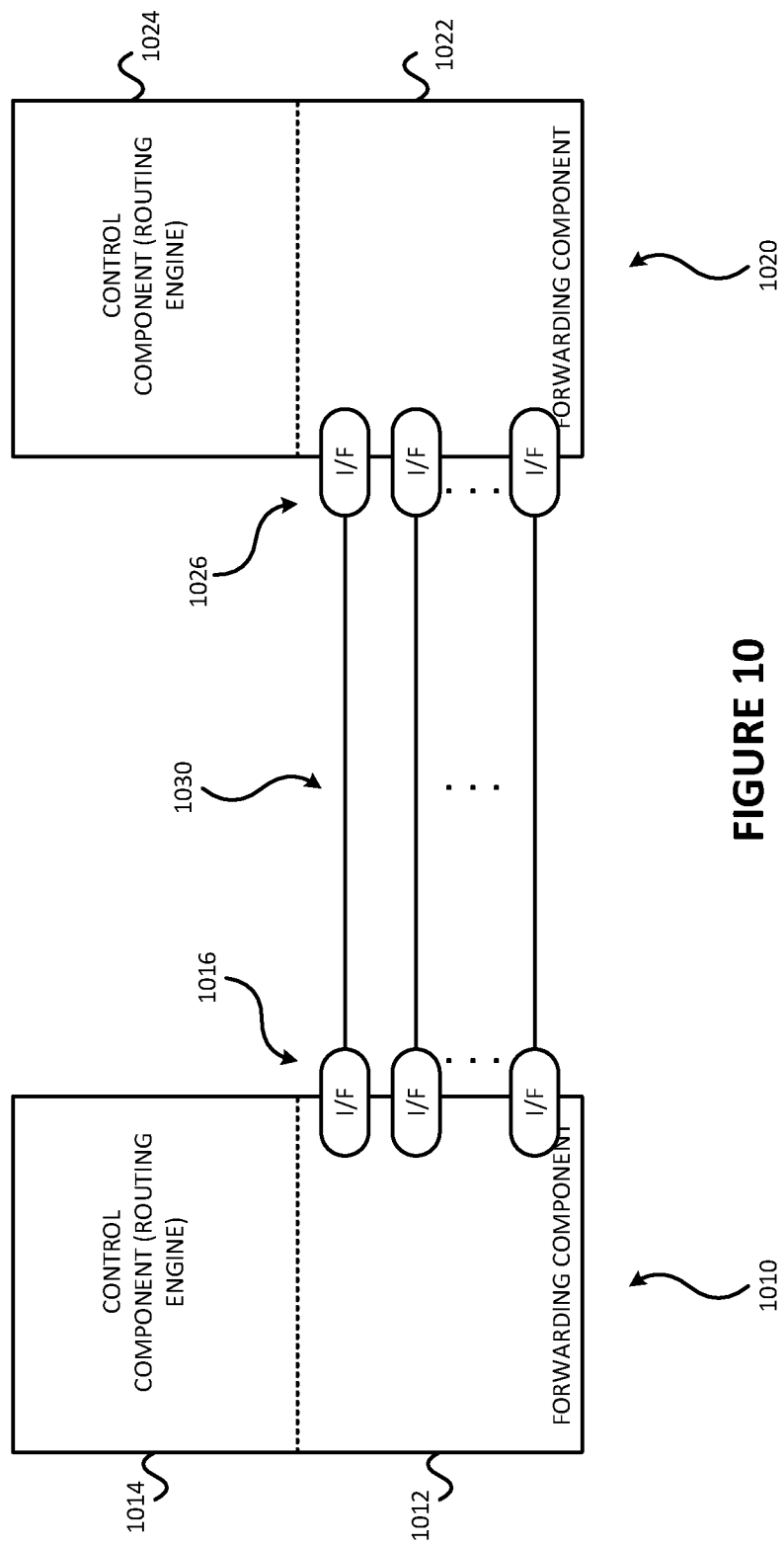
FIG. 10 illustrates two data forwarding systems, which may be used as BGP peers, coupled via communications links.

FIG. 10 illustrates two data forwarding systems 1010 and 1020 coupled via communications links 1030. The links may be physical links or "wireless" links. The data forwarding systems 1010,1020 may be routers for example, and may BGP peer devices. If the data forwarding systems 1010,1020 are example routers, each may include a control component (e.g., a routing engine) 1014,1024 and a forwarding component 1012,1022. Each data forwarding system 1010,1020 includes one or more interfaces 1016,1026 that terminate one or more communications links 1030. The example method 900 (or instances thereof) may be implemented in the control components 1014,1024.

As just discussed above, and referring to FIG. 11, some example routers 1100 include a control component (e.g., routing engine) 1110 and a packet forwarding component (e.g., a packet forwarding engine) 1190. The example method 900 may be implemented in the control components 1110.

The control component 1110 may include an operating system (OS) kernel 1120, routing protocol process(es) 1130, label-based forwarding protocol process(es) 1140, interface process(es) 1150, user interface (e.g., command line interface) process(es) 1160, and chassis process(es) 1170, and may store routing table(s) 1139, label forwarding information 1145, and forwarding (e.g., route-based and/or label-based) table(s) 1180. As shown, the routing protocol process(es) 1130 may support routing protocols such as the routing information protocol ("RIP") 1131, the intermediate system-to-intermediate system protocol ("IS-IS") 1132, the open shortest path first protocol ("OSPF") 1133, the enhanced interior gateway routing protocol ("EIGRP") 1134 and the boarder gateway protocol ("BGP") 1135, and the label-based forwarding protocol process(es) 1140 may support protocols such as BGP 1135, the label distribution protocol ("LDP") 1136 and the resource reservation protocol ("RSVP") 1137. One or more components (not shown) may permit a user 1165 to interact with the user interface process(es) 1160. Similarly, one or more components (not shown) may permit an outside device to interact with one or more of the router protocol process(es) 1130, the label-based forwarding protocol process(es) 1140, the interface process(es) 1150, and the chassis process(es) 1170, via SNMP 1185, and such processes may send information to an outside device via SNMP 1185. The example method 900 may be implemented in the boarder gateway protocol ("BGP") process 1135.

The packet forwarding component 1190 may include a microkernel 1192, interface process(es) 1193, distributed ASICs 1194, chassis process(es) 1195 and forwarding (e.g., route-based and/or label-based) table(s) 1196.

Figure 11:
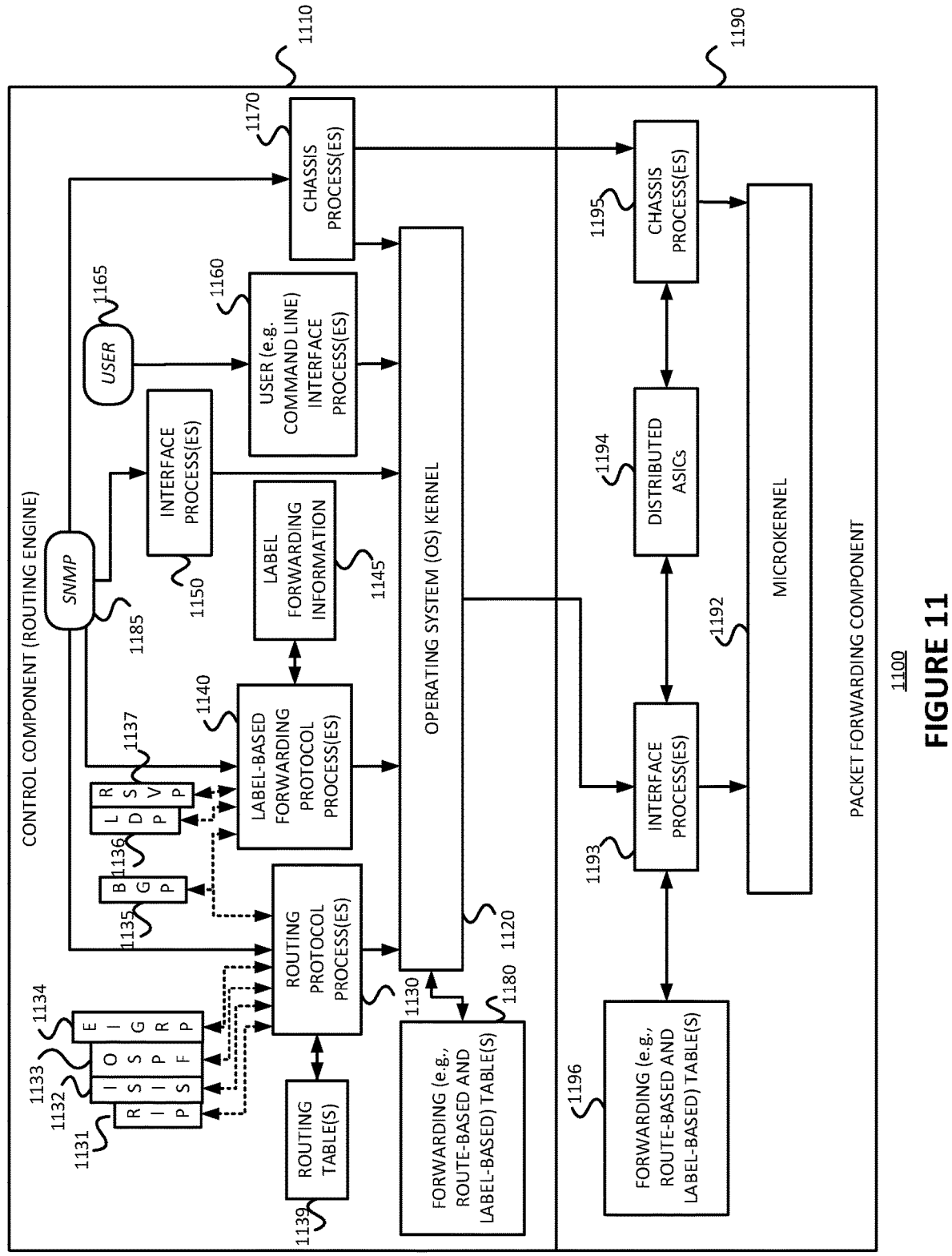
FIG. 11 is a block diagram of a router which may be used as a BGP peer device.

In the example router 1100 of FIG. 11, the control component 1110 handles tasks such as performing routing protocols, performing label-based forwarding protocols, control packet processing, etc., which frees the packet forwarding component 1190 to forward received packets quickly. That is, received control packets (e.g., routing protocol packets and/or label-based forwarding protocol packets) are not fully processed on the packet forwarding component 1190 itself, but are passed to the control component 1110, thereby reducing the amount of work that the packet forwarding component 1190 has to do and freeing it to process packets to be forwarded efficiently. Thus, the control component 1110 is primarily responsible for running routing protocols and/or label-based forwarding protocols, maintaining the routing tables and/or label forwarding information, sending forwarding table updates to the packet forwarding component 1190, and performing system management. The example control component 1110 may handle routing protocol packets, provide a management interface, provide configuration management, perform accounting, and provide alarms. The processes 1130, 1140, 1150, 1160 and 1170 may be modular, and may interact with the OS kernel 1120. That is, nearly all of the processes communicate directly with the OS kernel 1120. Using modular software that cleanly separates processes from each other isolates problems of a given process so that such problems do not impact other processes that may be running. Additionally, using modular software facilitates easier scaling.

Still referring to FIG. 11, the example OS kernel 1120 may incorporate an application programming interface ("API") system for external program calls and scripting capabilities. The control component 1110 may be based on an Intel PCI platform running the OS from flash memory, with an alternate copy stored on the router's hard disk. The OS kernel 1120 is layered on the Intel PCI platform and establishes communication between the Intel PCI platform and processes of the control component 1110. The OS kernel 1120 also ensures that the forwarding tables 1196 in use by the packet forwarding component 1190 are in sync with those 1180 in the control component 1110. Thus, in addition to providing the underlying infrastructure to control component 1110 software processes, the OS kernel 1120 also provides a link between the control component 1110 and the packet forwarding component 1190.

Referring to the routing protocol process(es) 1130 of FIG. 11, this process(es) 1130 provides routing and routing control functions within the platform. In this example, the RIP 1131, ISIS 1132, OSPF 1133 and EIGRP 1134 (and BGP 1135) protocols are provided. Naturally, other routing protocols may be provided in addition, or alternatively. Similarly, the label-based forwarding protocol process(es) 1140 provides label forwarding and label control functions. In this example, the LDP 1136 and RSVP 1137 (and BGP 1135) protocols are provided. Naturally, other label-based forwarding protocols (e.g., MPLS) may be provided in addition, or alternatively. In the example router 1100, the routing table(s) 1139 is produced by the routing protocol process(es) 1130, while the label forwarding information 1145 is produced by the label-based forwarding protocol process(es) 1140.

Still referring to FIG. 11, the interface process(es) 1150 performs configuration of the physical interfaces (Recall, e.g., 1016 and 1026 of FIG. 10.) and encapsulation.

The example control component 1110 may provide several ways to manage the router. For example, it 1110 may provide a user interface process(es) 1160 which allows a system operator 1165 to interact with the system through configuration, modifications, and monitoring. The SNMP 1185 allows SNMP-capable systems to communicate with the router platform. This also allows the platform to provide necessary SNMP information to external agents. For example, the SNMP 1185 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 1110, thereby avoiding slowing traffic forwarding by the packet forwarding component 1190.

Although not shown, the example router 1100 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 1160 via a console port, an auxiliary port, and/or a management Ethernet port The packet forwarding component 1190 is responsible for properly outputting received packets as quickly as possible. If there is no entry in the forwarding table for a given destination or a given label and the packet forwarding component 1190 cannot perform forwarding by itself, it 1190 may send the packets bound for that unknown destination off to the control component 1110 for processing. The example packet forwarding component 1190 is designed to perform Layer 2 and Layer 3 switching, route lookups, and rapid packet forwarding.

As shown in FIG. 11, the example packet forwarding component 1190 has an embedded microkernel 1192, interface process(es) 1193, distributed ASICs 1194, and chassis process(es) 1195, and stores a forwarding (e.g., route-based and/or label-based) table(s) 1196. The microkernel 1192 interacts with the interface process(es) 1193 and the chassis process(es) 1195 to monitor and control these functions. The interface process(es) 1192 has direct communication with the OS kernel 1120 of the control component 1110. This communication includes forwarding exception packets and control packets to the control component 1110, receiving packets to be forwarded, receiving forwarding table updates, providing information about the health of the packet forwarding component 1190 to the control component 1110, and permitting configuration of the interfaces from the user interface (e.g., CLI) process(es) 1160 of the control component 1110. The stored forwarding table(s) 1196 is static until a new one is received from the control component 1110. The interface process(es) 1193 uses the forwarding table(s) 1196 to look up next-hop information. The interface process(es) 1193 also has direct communication with the distributed ASICs 1194. Finally, the chassis process(es) 1195 may communicate directly with the microkernel 1192 and with the distributed ASICs 1194.

Figure 12:
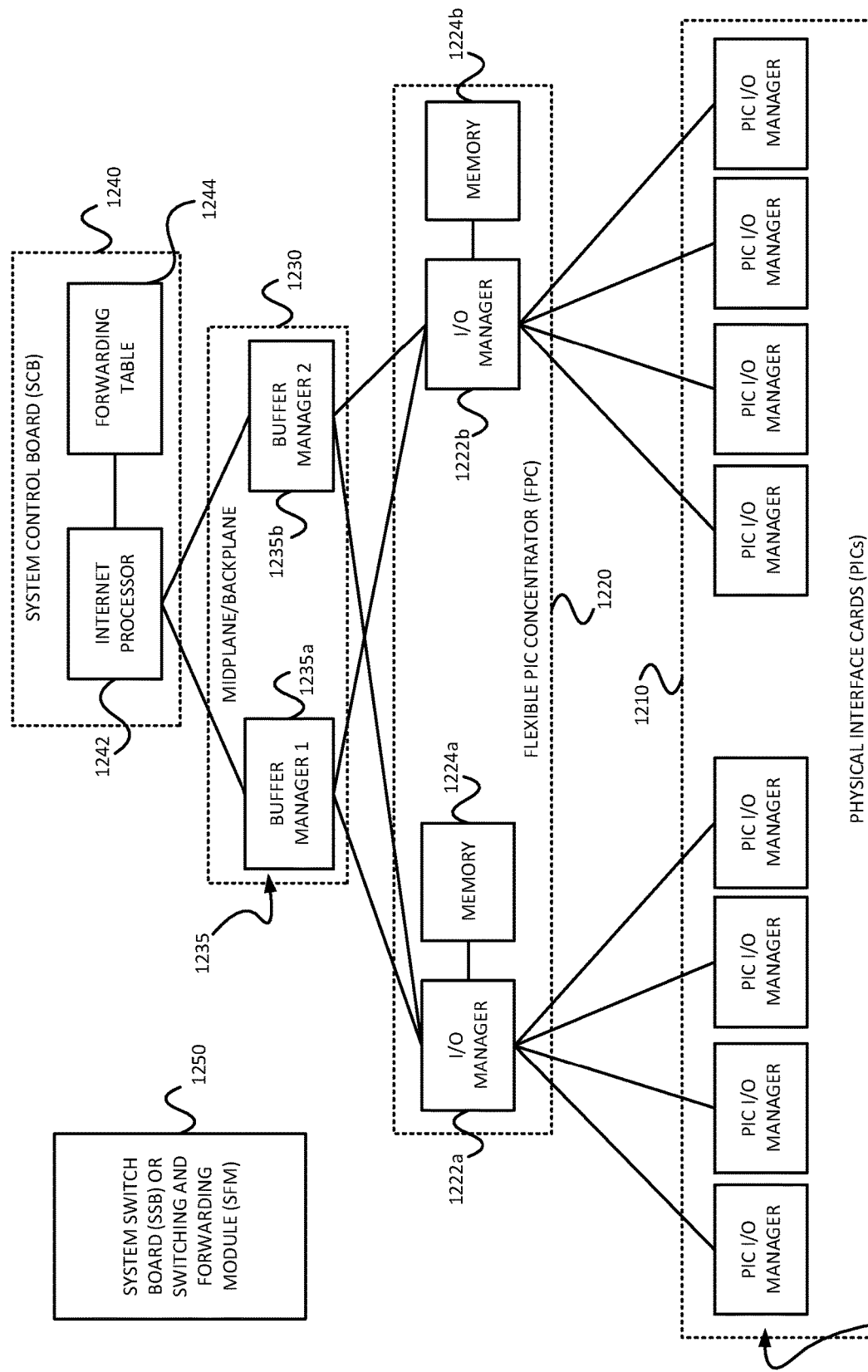
FIG. 12 is an example architecture in which ASICS may be distributed in a packet forwarding component to divide the responsibility of packet forwarding.

Referring back to distributed ASICs 1194 of FIG. 11, FIG. 12 is an example of how the ASICS may be distributed in the packet forwarding component 1190 to divide the responsibility of packet forwarding. As shown in FIG. 12, the ASICs of the packet forwarding component 1190 may be distributed on physical interface cards ("PICs") 1210, flexible PIC concentrators ("FPCs") 1220, a midplane or backplane 1230, and a system control board(s) 1240 (for switching and/or forwarding). Switching fabric is also shown as a system switch board ("SSB"), or a switching and forwarding module ("SFM") 1250. Each of the PICs 1210 includes one or more PIC I/O managers 1215. Each of the FPCs 1220 includes one or more I/O managers 1222, each with an associated memory 1224. The midplane/backplane 1230 includes buffer managers 1235*a*, 1235*b*. Finally, the system control board 1240 includes an internet processor 1242 and an instance of the forwarding table 1244 (Recall, e.g., 1196 of FIG. 11).

Still referring to FIG. 12, the PICs 1210 contain the interface ports. Each PIC 1210 may be plugged into an FPC 1220. Each individual PIC 1210 may contain an ASIC that handles media-specific functions, such as framing or encapsulation. Some example PICs 1210 provide SDH/SONET, ATM, Gigabit Ethernet, Fast Ethernet, and/or DS3/E3 interface ports.

An FPC 1220 can contain from one or more PICs 1210, and may carry the signals from the PICs 1210 to the midplane/backplane 1230 as shown in FIG. 12.

The midplane/backplane 1230 holds the line cards. The line cards may connect into the midplane/backplane 1230 when inserted into the example router's chassis from the front. The control component (e.g., routing engine) 1110 may plug into the rear of the midplane/backplane 1230 from the rear of the chassis. The midplane/backplane 1230 may carry electrical (or optical) signals and power to each line card and to the control component 1110.

The system control board 1240 may perform forwarding lookup. It 1240 may also communicate errors to the routing engine. Further, it 1240 may also monitor the condition of the router based on information it receives from sensors. If an abnormal condition is detected, the system control board 1240 may immediately notify the control component 1110.

Referring to FIGS. 12, 13A and 13B, in some exemplary routers, each of the PICs 1210,1110' contains at least one I/O manager ASIC 1215 responsible for media-specific tasks, such as encapsulation. The packets pass through these I/O ASICs on their way into and out of the router. The I/O manager ASIC 1215 on the PIC 1211,1011' is responsible for managing the connection to the I/O manager ASIC 1222 on the FPC 1220,1120', managing link-layer framing and creating the bit stream, performing cyclical redundancy checks (CRCs), and detecting link-layer errors and generating alarms, when appropriate. The FPC 1220 includes another I/O manager ASIC 1222. This ASIC 1222 takes the packets from the PICs 1210 and breaks them into (e.g., 74-byte) memory blocks. This FPC I/O manager ASIC 1222 sends the blocks to a first distributed buffer manager (DBM) 1235*a'*, decoding encapsulation and protocol-specific information, counting packets and bytes for each logical circuit, verifying packet integrity, and applying class of service (CoS) rules to packets. At this point, the packet is first written to memory. More specifically, the example DBM ASIC 1235*a'* manages and writes packets to the shared memory 1224 across all FPCs 1220. In parallel, the first DBM ASIC 1235*a'* also extracts information on the destination of the packet and passes this forwarding-related information to the Internet processor 1242/1142'. The Internet processor 1242/1142' performs the route lookup using the forwarding table 1244 and sends the information over to a second DBM ASIC 1235*b'*. The Internet processor ASIC 1242/1142' also collects exception packets (i.e., those without a forwarding table entry) and sends them to the control component 1110. The second DBM ASIC 1235*b'* then takes this information and the 74-byte blocks and forwards them to the I/O manager ASIC 1222 of the egress FPC 1220/1120' (or multiple egress FPCs, in the case of multicast) for reassembly. (Thus, the DBM ASICs 1235*a'* and 1235*b'* are responsible for managing the packet memory 1224 distributed across all FPCs 1220/1120', extracting forwarding-related information from packets, and instructing the FPC where to forward packets.)

The I/O manager ASIC 1222 on the egress FPC 1220/1120' may perform some value-added services. In addition to incrementing time to live ("TTL") values and re-encapsulating the packet for handling by the PIC 1210, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 1222 on the egress FPC 1220/1120' may be responsible for receiving the blocks from the second DBM ASIC 1235*b'*, incrementing TTL values, queuing a pointer to the packet, if necessary, before applying CoS rules, re-encapsulating the blocks, and sending the encapsulated packets to the PIC I/O manager ASIC 1215.

Figure 14:
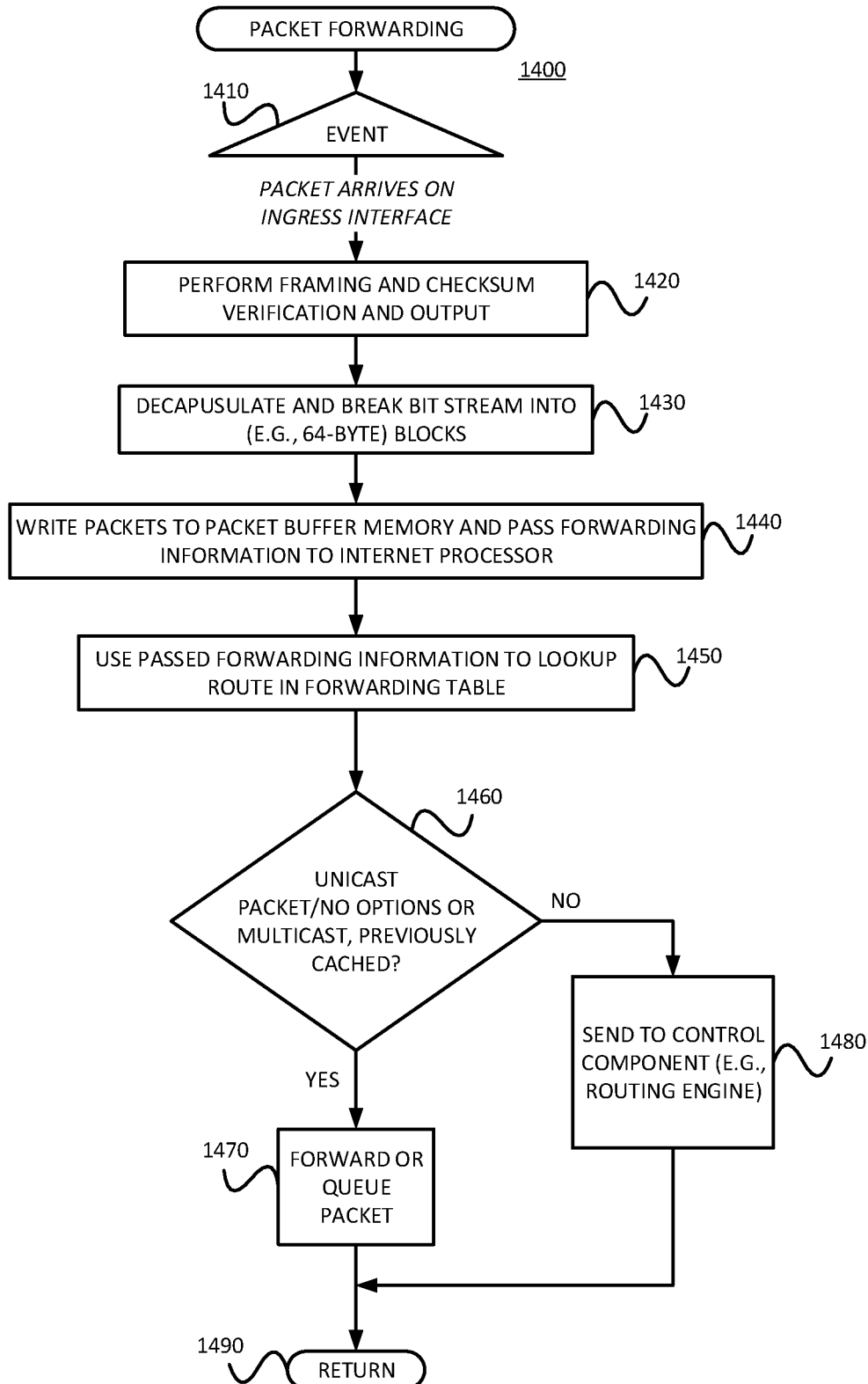
FIG. 14 is a flow diagram of an example method for providing packet forwarding in an example router.

FIG. 14 is a flow diagram of an example method 1400 for providing packet forwarding in the example router. The main acts of the method 1400 are triggered when a packet is received on an ingress (incoming) port or interface. (Event 1410) The types of checksum and frame checks that are required by the type of medium it serves are performed and the packet is output, as a serial bit stream. (Block 1420) The packet is then decapsulated and parsed into (e.g., 64-byte) blocks. (Block 1430) The packets are written to buffer memory and the forwarding information is passed on the Internet processor. (Block 1440) The passed forwarding information is then used to lookup a route in the forwarding table. (Block 1450) Note that the forwarding table can typically handle unicast packets that do not have options (e.g., accounting) set, and multicast packets for which it already has a cached entry. Thus, if it is determined that these conditions are met (YES branch of Decision 1460), the packet forwarding component finds the next hop and egress interface, and the packet is forwarded (or queued for forwarding) to the next hop via the egress interface (Block 1470) before the method 1400 is left (Node 1490) Otherwise, if these conditions are not met (NO branch of Decision 1460), the forwarding information is sent to the control component 1110 for advanced forwarding resolution (Block 1480) before the method 1400 is left (Node 1490).

Referring back to block 1470, the packet may be queued. Actually, as stated earlier with reference to FIG. 12, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1222 may send a request for the packet to the second DBM ASIC 1235*b*. The DBM ASIC 1235 reads the blocks from shared memory and sends them to the I/O manager ASIC 1222 on the FPC 1220, which then serializes the bits and sends them to the media-specific ASIC of the egress interface. The I/O manager ASIC 1215 on the egress PIC 1210 may apply the physical-layer framing, perform the CRC, and send the bit stream out over the link.

Referring back to block 1480 of FIG. 14, as well as FIG. 12, regarding the transfer of control and exception packets, the system control board 1240 handles nearly all exception packets. For example, the system control board 1240 may pass exception packets to the control component 1110.

Although example embodiments consistent with the present invention may be implemented on the example routers of FIG. 10 or 11, embodiments consistent with the present invention may be implemented on communications network nodes (e.g., routers, switches, etc.) having different architectures. More generally, embodiments consistent with the present invention may be implemented on an example system 1500 as illustrated on FIG. 15.

Figure 15:
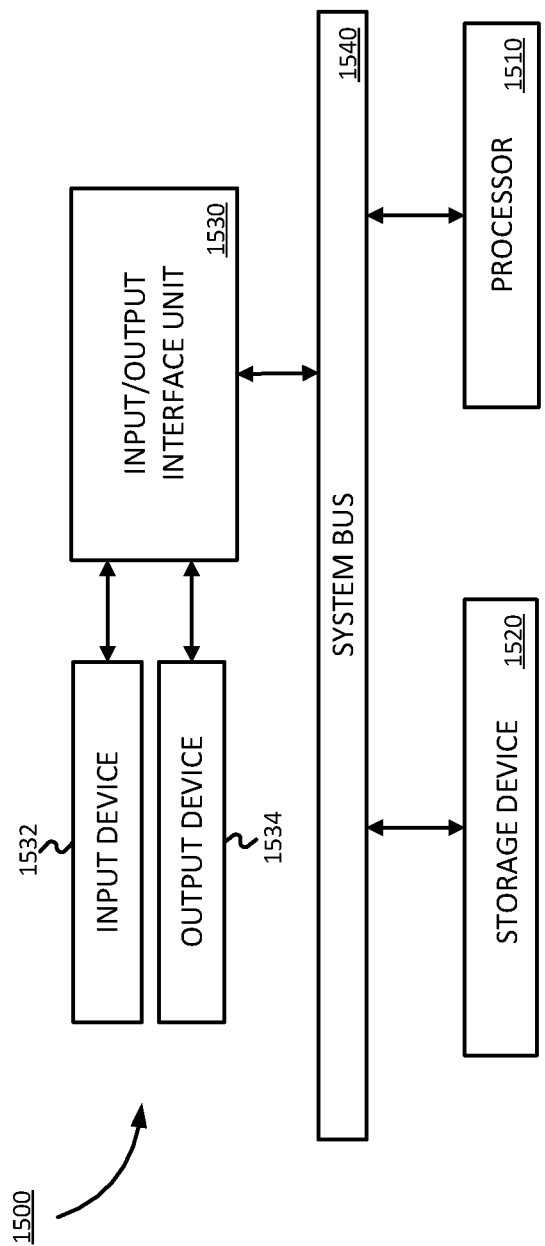
FIG. 15 is a block diagram of an exemplary machine that may perform one or more of the processes described, and/or store information used and/or generated by such processes.

FIG. 15 is a block diagram of an exemplary machine 1500 that may perform one or more of the processes described, and/or store information used and/or generated by such processes. The exemplary machine 1500 includes one or more processors 1510, one or more input/output interface units 1530, one or more storage devices 1520, and one or more system buses and/or networks 1540 for facilitating the communication of information among the coupled elements. One or more input devices 1532 and one or more output devices 1534 may be coupled with the one or more input/output interfaces 1530. The one or more processors 1510 may execute machine-executable instructions (e.g., C or C++ running on the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1520 and/or may be received from an external source via one or more input interface units 1530. The machine executable instructions may be stored as various software modules, each module performing one or more operations. Functional software modules are examples of components of the invention.

In some embodiments consistent with the present invention, the processor 1510 may be one or more microprocessors and/or ASICs. The bus 1540 may include a system bus. The storage device 1520 may include system memory, such as read only memory (ROM) and/or random access memory (RAM). The storage devices 1520 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present invention (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a server (e.g., a software defined network controller), a tablet computer, a mobile phone, or any device that has computing and networking capabilities.

§ 4.4 Refinements, Alternatives and Extensions

Although some example embodiments were described in the context of BGP, example embodiments consistent with the present description can be applied to other (e.g., distance vector) control signaling protocols.

§ 4.4.1 Example FIB Entries

Referring back to block 940 of FIG. 9, the following types of FIB entries may be added. As a first example, if the BGP message was received by the BGP peer device from the downstream BGP peer device over a single hop external session, then the forwarding operation is pop and forward over an egress interface that connects the BGP peer directly to the downstream BGP peer. As a second example, if the BGP message was received by the BGP peer device from the downstream BGP peer device over a multi-hop internal session, then the forwarding operation is a swap and forward. The "swap-to" label(s) value is outgoing label(s) for LSP that has MPLS Forwarding Equivalent Class (FEC) equal to learned value of BGP NH attribute and was used to resolve learned BGP next hop attribute of given BGP path. As a third example, if the BGP message was received by the BGP peer device from the downstream BGP peer device over a multi-hop internal session in which a non-MPLS tunnel (e.g., GRE, MPLS-over-UDP, SRv6, etc.) is used by BGP peer device to resolve the next hop value, then the forwarding operation is a pop, encapsulate and forward.

The locally assigned label may be programmed in MPLS FIB in data-plane of BGP speaker as a key.

§ 4.4.2 Example Ways to Determine a Local Label

Referring back to block 920, the local label included in the label stack, which is included in the new BGP message, may be determined in various ways. As a first example, if the BGP peer device is configured with an explicit label value binding for the network address of the downstream BGP device provided as the next hop value, then the local label is set to the explicit label value binding. As a second example, if the next hop value is resolved via a tunnel that has a binding segment identifier (BSID) value, then the local label is set to the BSID value. As a third example, if the next hop value is resolved via tunnel that is instantiated by processing one of (i) a prefix segment identifier (SID), (ii) a node SID, or (iii) an anycast SID, then the BGP peer device has a Segment Routing Global Block (SRGB) which defines a range of label values reserved for segment routing, and the local label is derived from the SRGB of the BGP peer device. As a fourth example, if the BGP peer device has previously allocated local label for a tunnel used for resolution of the next hop value, then the local label is set to the previously allocated local label. As a fifth example, if the BGP peer device has a dynamic label block, then the local label is assigned one of available labels of the dynamic label block. Note that using method described in example one, two, three and by inherence four, it is possible assign same label value on more than one BGP speaker such that they provide mutual protection. Label value synchronization may be achieved by local binding configuration on each box, BSID value assignment, and/or use of Anycast SID.

§ 4.4.3 Non-BGP and Non-MPLS Implementations

Although some example embodiments are described in the context of BGP, at least some of these example embodiments may be extended to (or used in the context of) other control signaling protocols instead. Although some example embodiments are described in the context of MPLS labels, at least some of these example embodiments may be extended for use with other types of labels used for forwarding data.

§ 4.5 Examples of Operations of Example Methods

Figure 16:
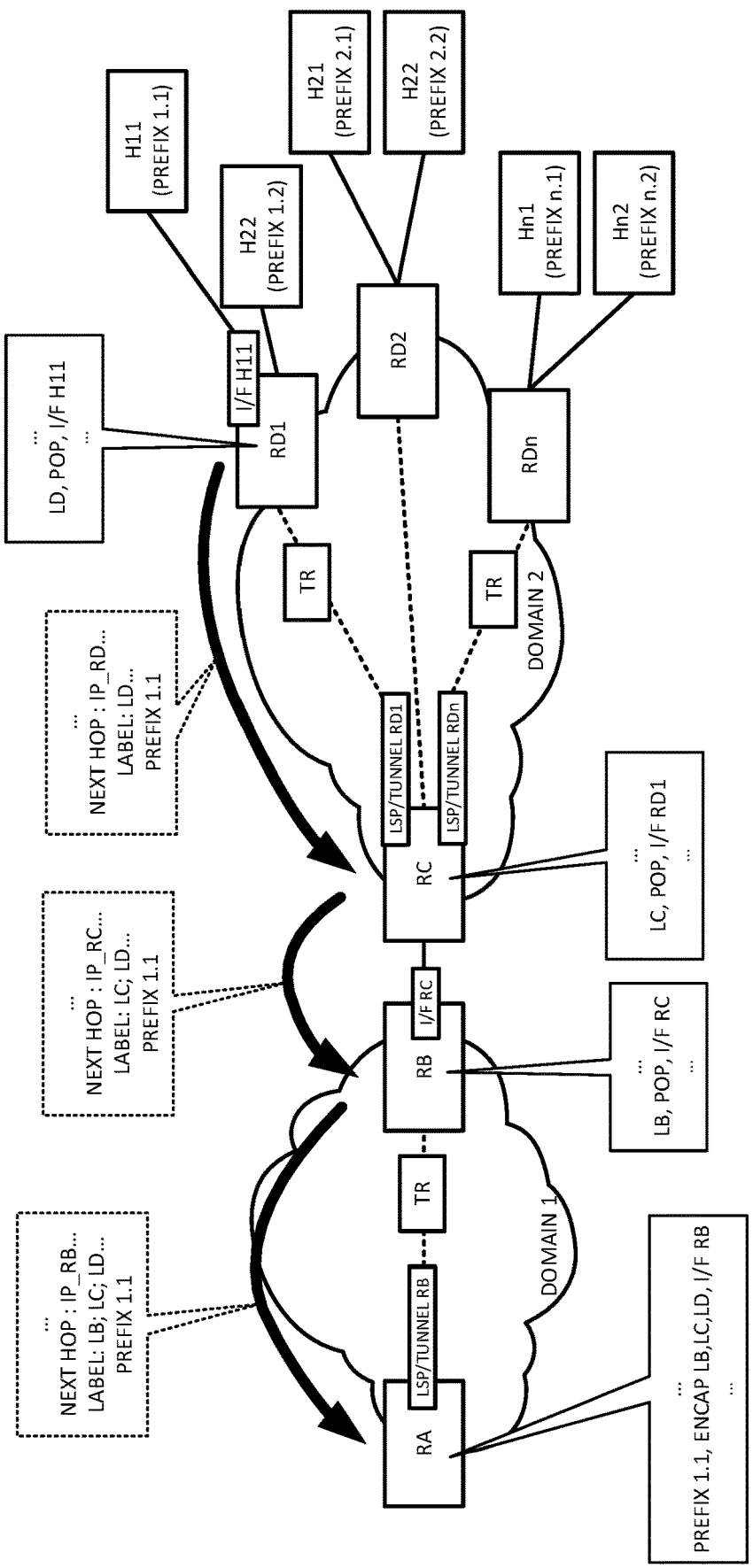
FIG. 16 is an example illustrating certain operations of an example method consistent with the present description.

FIG. 16 is an example illustrating certain operations of an example method consistent with the present description. Assume that RA, RB, RC, RD1, RD2, RDn are routes, and in particular, BGP speakers. Assume that RA has a next hop self IP address IP_RA and local label LA, RB has a next hop self IP address IP_RB and local label LB, RC has a next hop self IP address IP_RC and local label LC, and RD1 has a next hop self IP address IP_RD and local label LD. Host H11 has an associated prefix 1.1 and is connected with interface I/F H11 of RD1.

Assume that RD1 creates a BGP UPDATE message to advertise that prefix 1.1 is reachable through it. The BGP UPDATE message includes next hop IP_RD, label LD and prefix 1.1, and is send to upstream BGP peer RC. Note that RD has a FIB entry including the label LD, command POP and outgoing interface I/F H11.

Upon receiving the BGP UPDATE message, RC updates the next hop to IP_RC and prepends its label (LC) on the label stack. The prefix remains the same. RC then sends the BGP UPDATE message to upstream BGP peer RB. Note that RC also creates a FIB entry including the label LC, the command POP and the outgoing LSP/tunnel RD1.

Upon receiving the BGP UPDATE message, RB updates the next hop to IP_RB and prepends its label (LB) on the label stack. The prefix remains the same. RB then sends the BGP UPDATE message to upstream BGP peer RA. Note that RB also creates a FIB entry including the label LB, the command POP and the outgoing interface OF RC.

Finally, upon receiving the BGP UPDATE message, RA (which is assumed to be the ingress), creates a FIB entry including the prefix corresponding to an MPLS FEC, a command to encapsulate an incoming packet with the prefix, with the label stack LB,LC,LD, and an outgoing LSP/tunnel RB.

If a packet designed for host H11 (having a destination address matching prefix 1.1) is received by RA, RA will encapsulate the packet with the label stack LB, LC, LD and send it to RB via its interface with RB. RB will pop the label LB and forward the resulting packet to RC via its interface with RC. RC will pop the label LC and forward the resulting packet to RD1 via its interface with RD1. Finally, RD1 will pop the label LD and forward the packet (as originally received by RA) to H11.

Figure 17:
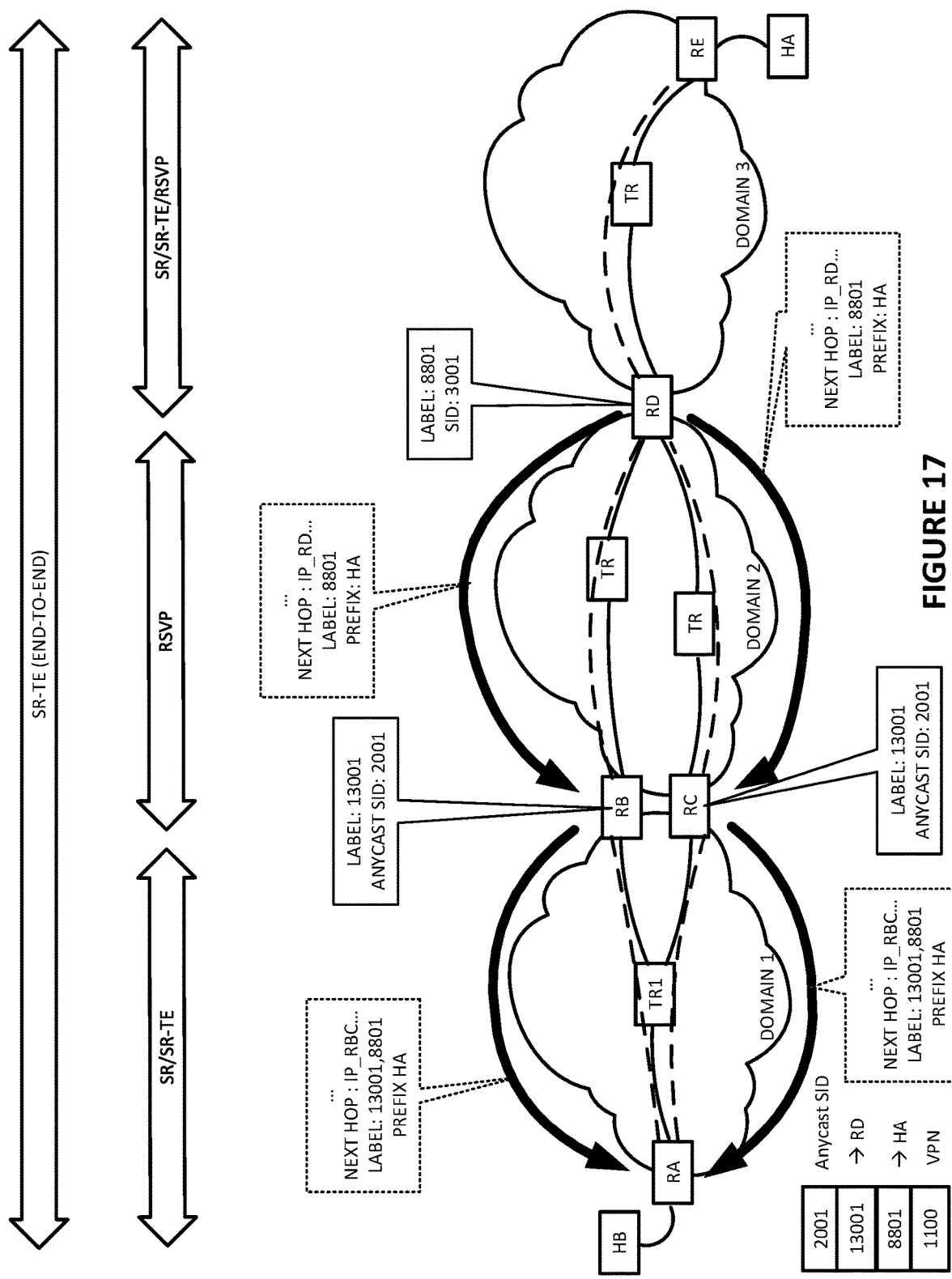
FIG. 17 is an example illustrating a use case of an example method consistent with the present description.

FIG. 17 is an example illustrating a use case of an example method consistent with the present description. Domains 1 and 3 may be metro (e.g., access) regions, while domain 2 may be a core (e.g., transport) region. HA and HB are host devices. RA, RB, RC, RD and RE are routers that can acts as BGP speakers, and TRs are intra-domain transit routers. Note that Anycast SID 2001 may be used to provide redundancy between RB and RC without needing any label change or additional label.

Assume that RA has a next hop self IP address IP_RA and local label LA, RB has a next hop self IP address IP_RBC, Anycast SID 2001 and SRGB base 11000, RC has a next hop self IP address IP_RBC, Anycast SID 2001 and SRGB base 11000, and RD1 has a next hop self IP address IP_RD, Node SID 3001, SRGB base 5800. Host HA has an associated prefix HA and is connected with interface I/F HA of RE1.

RB and RC have the same next hop self IP address (namely, IP_RBC), anycast SID and SRGB base. Therefore, the derived local label of RB and RC is the same (13001). The local label of RD is derived and equal to 8801.

Assume that RD sends a BGP UPDATE message to advertise that prefix HA is reachable through it. The BGP UPDATE message includes next hop IP_RD, label 8801 and prefix HA, and is send to upstream BGP peers RB and RC. Note that RD has a FIB entry including the label 8801, command SWAP to LSP/tunnel to RE.

Upon receiving the BGP UPDATE message, each of RB and RC updates the next hop to IP_RBC and prepends its label (13001) on the label stack. The prefix (HA) remains the same. Each of RB and RC then sends the BGP UPDATE message to upstream BGP peer RB. Note that each of RB and RC also creates a FIB entry including the label 13001, the command SWAP to LSP/tunnel to RD.

Finally, upon receiving the both BGP UPDATE messages, RA (which is assumed to be the ingress) selects one best path (assume the one from RB), creates a FIB entry including the prefix corresponding to an MPLS FEC, a command to encapsulate an incoming packet with the prefix, with the label stack 13001,8801 and encapsulate into LSP/tunnel to IP_RBC.

If a packet designed for host HA (having a destination address matching prefix HA) is received by RA, RA will encapsulate the packet with the label stack 13001,8801 and send it via its tunnel to IP_RBC. The packet may appear on RB or RC, depending on a local routing decision at transit router TR1. In this example, assume that TR1 sends the packet to RB. Using the information programmed into its FIB, RB will pop the top label 13001 and forward the resulting packet to RD via its LSP/tunnel to RD. Using the information programmed into its FIB, RD will pop the label

8801 and forward the resulting packet to RE via LSP/tunnel to RE. Finally, using the information programmed into its FIB, RE will forward the packet (as originally received by RA) to HA.

Upon failure of RB and/or the TR1-RB link, TR1 can immediately re-direct traffic to RC, without notifying RA, and restore connectivity before network control plane (BGP and IGP) converge. The RC will pop the label 13001 and forward the resulting packet to RD via its LSP/tunnel to RD. RD will pop the label 8801 and forward the resulting packet to RE via LSP/tunnel to RE. Finally, RE will forward the packet (as originally received by RA) to HA.

Note that label 13001 is assigned locally by RB and RC, and label 8801 is assigned locally by RD. These labels can be thought of as an abstraction of path to nexthop. These labels could be, for example, a Binding-SID for SR-TE, a Binding-SID for RSVP, a Binding-SID for another tunnel type, a Prefix SID for SR, or any local label for other encapsulation such as, for example, LDP or MPLSoUDP.

§ 4.6 Conclusions

As should be appreciated from the foregoing, example embodiments consistent with the present description allow labels to be used more efficiently, and/or reduce processing needed to maintain a forwarding information base (FIB).

At least some example embodiments consistent with the present description provide an alternative procedure of manipulating label(s) in labeled NLRI on a BGP next hop change. Instead of replacing a label(s) learned from downstream peer, such label(s) are retained and prepended by additional locally assigned label. The local label is bound to the IP address of the BGP next hop attribute value prior modification (i.e., the value learned from downstream peer).

Since the number of unique next hop attribute values learned is significantly smaller than total number of labeled prefixes, scale pressure on BGP speaker local label space is relived. Consequently, on routing re-convergence, even less states need to be re-programmed in data-plane as well.

Finally, since only one label needs to be added to the top of the label stack per IGP domain in an iBGP scenario, or per ASBR in an eBGP scenario, the label stack depth is predictable from the perspective of the first ingress router (which may be important when designing networks having devices with depth of label limitations (e.g., due to ASIC or other hardware limitations)).

What is claimed is:

1. A computer-implemented method for use on a distance vector control signaling protocol peer device, the computer-implemented method comprising:
    a) receiving, by the peer device, a control plane message from a downstream peer device, the control plane message including
        1) a network address of the downstream device as a next hop value,
        2) a prefix value, and
        3) at least one label associated with the prefix value; and
    b) responsive to receiving the control plane message,
        1) generating, by the peer device, a new control plane message including
            A) a network address of the peer device as a next hop value,
            B) the prefix value from the control plane message, and
            C) a label stack including (i) the at least one label from the control plane message, and (ii) a local label associated with the peer device, and
        2) sending, by the peer device, the new control plane message to an upstream peer device.

2. The computer-implemented method of claim 1 wherein, responsive to receiving the control plane message, further comprises:
    3) adding, by the peer device, an entry to a forwarding information base (FIB) in
    a data-plane of the peer device, the entry including
        A) the local label as a key, and
        B) a forwarding operation associated with the local label.

3. The computer-implemented method of claim 2 wherein the forwarding operation is one of (i) pop and forward, (ii) swap and forward, or (iii) pop, encapsulate and forward.

4. The computer-implemented method of claim 2 wherein the distance vector control signaling protocol is the border gateway protocol (BGP),
    wherein the peer device is a BGP peer device,
    wherein the control plane message is a BGP message,
    wherein the BGP message was received by the BGP peer device from the downstream BGP peer device over a single hop BGP session in which the next hop value is an address belonging to locally attached network, and
    wherein the forwarding operation is pop and forward over an egress interface that connects the BGP peer directly to the downstream BGP peer.

5. The computer-implemented method of claim 2 wherein the distance vector control signaling protocol is the border gateway protocol (BGP),
    wherein the peer device is a BGP peer device,
    wherein the control plane message is a BGP message,
    wherein the BGP message was received by the BGP peer device from the downstream BGP peer device over a multi-hop BGP session in which a MPLS tunnel (LSP) is used by BGP peer device to resolve the next hop value, and
    wherein the forwarding operation is a swap and forward.

6. The computer-implemented method of claim 2 wherein the distance vector control signaling protocol is the border gateway protocol (BGP),
    wherein the peer device is a BGP peer device,
    wherein the control plane message is a BGP message,
    wherein the BGP message was received by the BGP peer device from the downstream BGP peer device over a multi-hop BGP session in which a non-MPLS tunnel is used by BGP peer device to resolve the next hop value, and
    wherein the forwarding operation is a pop, encapsulate and forward.

7. The computer-implemented method of claim 1 wherein the distance vector control signaling protocol is the border gateway protocol (BGP),
    wherein the peer device is a BGP peer device,
    wherein the control plane message is a BGP message,
    wherein the BGP peer device is configured with an explicit label value binding for the network address of the downstream BGP device provided as the next hop value, and
    wherein the local label is set to the explicit label value binding.

8. The computer-implemented method of claim 1 wherein the distance vector control signaling protocol is the border gateway protocol (BGP), wherein the peer device is a BGP peer device,
wherein the control plane message is a BGP message,
wherein the next hop value is resolved via a tunnel that has a binding segment identifier (BSID) value, and
wherein the local label is set to the BSID value.

9. The computer-implemented method of claim 1 wherein the distance vector control signaling protocol is the border gateway protocol (BGP),
wherein the peer device is a BGP peer device,
wherein the control plane message is a BGP message,
wherein the next hop value is resolved via tunnel that is instantiated by processing one of (i) a prefix segment identifier (SID), (ii) a node SID, or (iii) an anycast SID,
wherein the BGP peer device has a Segment Routing Global Block (SRGB) which defines a range of label values reserved for segment routing, and
wherein the local label is derived from the SRGB of the BGP peer device.

10. The computer-implemented method of claim 1 wherein the distance vector control signaling protocol is the border gateway protocol (BGP),
wherein the peer device is a BGP peer device,
wherein the control plane message is a BGP message,
wherein the BGP peer device has previously allocated local label for a tunnel used for resolution of the next hop value, and
wherein the local label is set to the previously allocated local label.

11. The computer-implemented method of claim 1 wherein the distance vector control signaling protocol is the border gateway protocol (BGP),
wherein the peer device is a BGP peer device,
wherein the control plane message is a BGP message,
wherein the BGP peer device has a dynamic label block, and
wherein the local label is assigned one of available labels of the dynamic label block.

12. A distance vector control signaling protocol peer device comprising:
a) a plurality of communications interfaces;
b) at least one control processor; and
c) a storage device storing processor-executable instructions which, when executed by the at least one control processor, cause the at least one control processor to perform a method comprising:
1) receiving, by the peer device on one of the plurality of communications interfaces, a control plane message from a downstream peer device, the control plane message including
A) a network address of the downstream device as a next hop value,
B) a prefix value, and
C) at least one label associated with the prefix value; and
2) responsive to receiving the control plane message,
A) generating, by the peer device, a new control plane message including
i) a network address of the peer device as a next hop value,
ii) the prefix value from the message, and
iii) a label stack including (i) the at least one label from the control plane message, and (ii) a local label associated with the peer device, and
B) sending, by the peer device, the new control plane message to an upstream peer device.

13. The peer device of claim 12 wherein, responsive to receiving the control plane message, the method further includes
C) adding, by the peer device, an entry to a forwarding information base (FIB) in a data-plane of the peer device, the entry including
A) the local label as a key, and
B) a forwarding operation associated with the local label.

14. The peer device of claim 13 wherein the forwarding operation is one of (i) pop and forward, (ii) swap and forward, or (iii) pop, encapsulate and forward.

15. The peer device of claim 12 wherein the distance vector control signaling protocol is the border gateway protocol (BGP),
wherein the peer device is a BGP peer device, and
wherein the control plane message is a BGP message.

16. A non-transitory computer-readable storage medium for use with distance vector control signaling protocol peer device, the non-transitory computer-readable storage medium storing processor executable instructions which, when executed by at least one processor, cause the at least one processor to perform a method comprising:
a) receiving, by the peer device, a control plane message from a downstream peer device, the control plane message including
1) a network address of the downstream peer device as a next hop value,
2) a prefix value, and
3) at least one label associated with the prefix value; and
b) responsive to receiving the control plane message,
1) generating, by the peer device, a new control plane message including
A) a network address of the peer device as a next hop value,
B) the prefix value from the control plane message, and
C) a label stack including (i) the at least one label from the control plane message, and (ii) a local label associated with the peer device, and
2) sending, by the peer device, the new control plane message to an upstream peer device.

17. A non-transitory computer-readable storage medium of claim 16 wherein, responsive to receiving the control plane message, the method further includes
3) adding, by the peer device, an entry to a forwarding information base (FIB) in a data-plane of the peer device, the entry including
A) the local label as a key, and
B) a forwarding operation associated with the local label.

18. The non-transitory computer-readable storage medium of claim 17 wherein the forwarding operation is one of (i) pop and forward, (ii) swap and forward, or (iii) pop, encapsulate and forward.

19. The non-transitory computer-readable storage medium of claim 16 wherein the distance vector control signaling protocol is the border gateway protocol (BGP),
wherein the peer device is a BGP peer device, and
wherein the control plane message is a BGP message.

* * * * *